United States Patent
Lee et al.

(10) Patent No.: US 10,319,086 B2
(45) Date of Patent: Jun. 11, 2019

(54) METHOD FOR PROCESSING IMAGE AND ELECTRONIC DEVICE SUPPORTING THE SAME

(71) Applicant: Samsung Electronics Co., Ltd., Gyeonggi-do (KR)

(72) Inventors: Wooyong Lee, Gyeonggi-do (KR); Hyejin Kang, Gyeonggi-do (KR); Gyuhee Han, Seoul (KR); Jae-Yun Song, Seoul (KR); Kihuk Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 113 days.

(21) Appl. No.: 15/221,883

(22) Filed: Jul. 28, 2016

(65) Prior Publication Data
US 2017/0046591 A1    Feb. 16, 2017

(30) Foreign Application Priority Data
Aug. 12, 2015   (KR) .................. 10-2015-0114208

(51) Int. Cl.
*G06K 9/36*    (2006.01)
*G06T 5/50*    (2006.01)
*H04N 5/232*    (2006.01)
*H04N 5/217*    (2011.01)
*H04N 5/357*    (2011.01)

(52) U.S. Cl.
CPC .............. *G06T 5/50* (2013.01); *H04N 5/217* (2013.01); *H04N 5/232* (2013.01); *H04N 5/23219* (2013.01); *H04N 5/3572* (2013.01); *G06K 2009/363* (2013.01)

(58) Field of Classification Search
CPC .. H04N 5/217; H04N 5/23219; H04N 5/3572; H04N 5/232; G06K 2009/363; G06T 5/50
See application file for complete search history.

(56) References Cited

U.S. PATENT DOCUMENTS

| | | | | |
|---|---|---|---|---|
| 5,768,443 A | * | 6/1998 | Michael | G06T 5/006 382/151 |
| 8,023,009 B2 | * | 9/2011 | Cho | H04N 5/217 348/222.1 |
| 2002/0085247 A1 | * | 7/2002 | Xu | H04N 1/00002 358/504 |

(Continued)

FOREIGN PATENT DOCUMENTS

| | | |
|---|---|---|
| JP | 2011-35891 A | 2/2011 |
| JP | 2015-95857 A | 5/2015 |
| KR | 10-2008-0105440 A | 12/2008 |

*Primary Examiner* — Shaghayegh Azima
(74) *Attorney, Agent, or Firm* — Cha & Reiter, LLC.

(57) ABSTRACT

According to various exemplary embodiments of the present disclosure, an electronic device may include a memory for storing one or more instructions, and a processor. The processor may be configured to acquire at least one image of at least one object, determine a change of an attribute corresponding to the at least one object, select at least one correction method based on the attribute change, correct the at least one image using the at least one correction method, and displaying the at least one image corrected by the at least one correction method on a display.

12 Claims, 27 Drawing Sheets

(56) References Cited

U.S. PATENT DOCUMENTS

| | | | | |
|---|---|---|---|---|
| 2006/0228100 A1* | 10/2006 | Ignatowicz | ............. | G06T 5/006 396/153 |
| 2007/0065039 A1* | 3/2007 | Park | ................... | H04N 5/23293 382/275 |
| 2007/0147701 A1* | 6/2007 | Tanaka | ............... | H04N 5/23219 382/274 |
| 2009/0296880 A1* | 12/2009 | Beets | ................... | A61B 6/4441 378/14 |
| 2011/0090303 A1* | 4/2011 | Wu | ................... | G06K 9/00228 348/14.16 |
| 2012/0133645 A1* | 5/2012 | Jung | ................... | H04N 13/128 345/419 |
| 2014/0293007 A1* | 10/2014 | Angot | ................. | H04N 13/026 348/45 |
| 2015/0086132 A1* | 3/2015 | Tsukagoshi | .......... | H04N 5/3572 382/275 |
| 2015/0091900 A1* | 4/2015 | Yang | ....................... | G06T 5/006 345/419 |
| 2016/0253791 A1* | 9/2016 | Kurata | ............... | G06K 9/00248 348/241 |
| 2017/0161951 A1* | 6/2017 | Fix | .......................... | G09G 5/00 |

\* cited by examiner

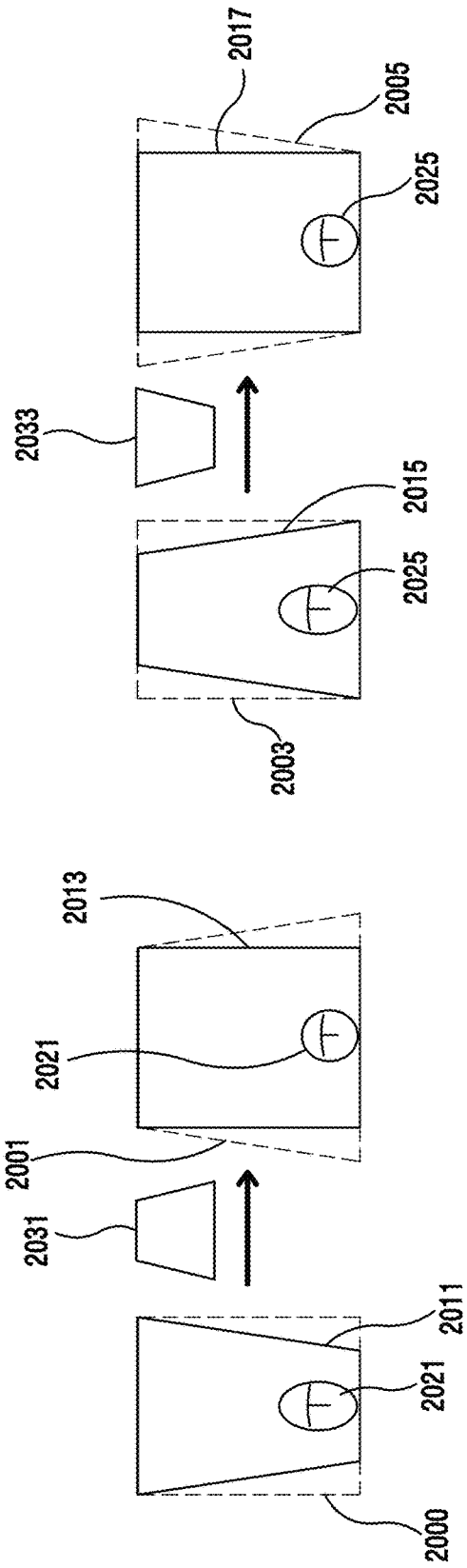

METHOD FOR PROCESSING IMAGE AND ELECTRONIC DEVICE SUPPORTING THE SAME

CLAIM OF PRIORITY

This application claims the benefit under 35 U.S.C. § 119(a) of a Korean patent application filed in the Korean Intellectual Property Office on Aug. 12, 2015 and assigned Serial No. 10-2015-0114208, the entire disclosure of which is hereby incorporated by reference.

BACKGROUND

1. Field of the Invention

Various exemplary embodiments disclosed in the present disclosure relate to an image processing method and an electronic device supporting the method.

2. Description of the Related Art

The distribution and use of various electronic devices, such as smartphones and tablets, are rapidly increasing due to remarkable technological developments. These electronic devices have been developed to converge with what traditionally have been separate devices. For example, the electronic device such as the smartphone now routinely includes a camera, which can capture not only a still image but also a moving image.

The camera included in the electronic device is currently continuously being improved. The camera of the electronic device is gradually becoming a high-end camera, and techniques for processing an image captured by the camera are also being enhanced. For example, the electronic device supports an image processing function for correcting distortions of objects (e.g., human faces) captured by the camera.

SUMMARY

Meanwhile, conventional techniques of image correction have disadvantages such as not taking into account various attributes of the object in the image when performing the image correction.

The present disclosure may provide an image processing method of providing an image to a user by correcting for a distortion in the image on the basis of a position, size, direction, or the like of an object in the image, and an electronic device supporting this.

Advantageous effects of the present disclosure are not limited to the aforementioned advantageous effects, and other unmentioned advantageous effects can be clearly understood by those skilled in the art from descriptions below.

According to one exemplary embodiment of the present disclosure, an electronic device may include a memory for storing one or more instructions, and a processor. The processor may be configured for acquiring at least one image of at least one object, determining a change of an attribute of corresponding to the at least one object, selecting at least one correction method based on the attribute change, correcting the at least one image using the at least one correction method, and displaying the at least one image corrected by the at least one correction method on a display.

According to one exemplary embodiment of the present disclosure, a method may include acquiring at least one image of at least one object in an electronic device, determining a change of an attribute corresponding to the at least one object, selecting at least one correction method based on the attribute change, correcting the at least one image using the at least one correction method, and displaying the at least one image corrected by the at least one correction method.

BRIEF DESCRIPTION OF THE DRAWINGS

FIG. 19A, FIG. 19B, FIG. 20A, and FIG. 20B illustrate an example of a method of correcting a distorted image at least based on a direction of an object according to another exemplary embodiment of the present disclosure;

DETAILED DESCRIPTION

Figure 1:
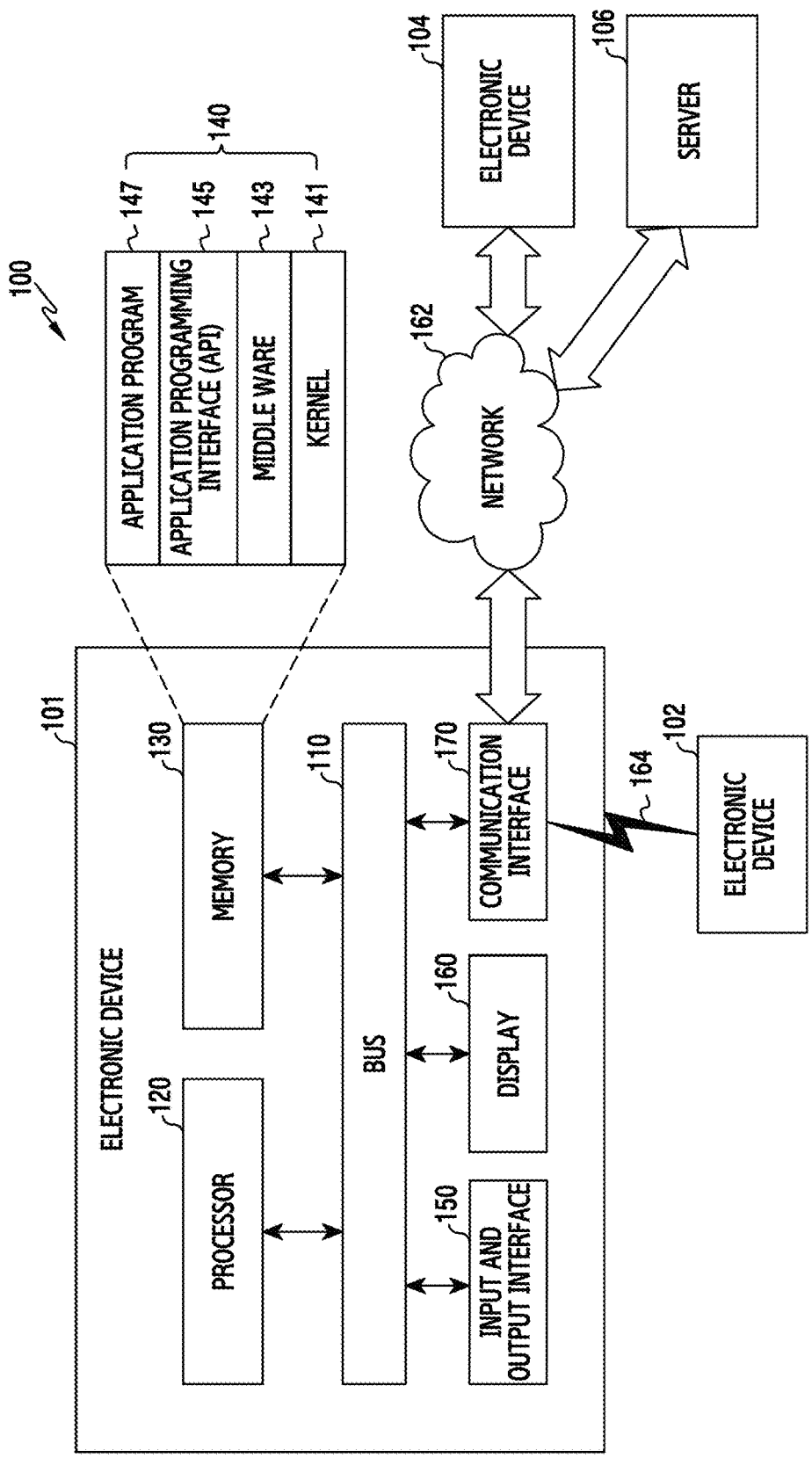
FIG. 1 illustrates an environment for a network including an electronic device according to various exemplary embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including both at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to various embodiments of the present disclosure.

An electronic device 101 within a network environment 100, according to various embodiments, will be described with reference to FIG. 1. The electronic device 101 may include a bus 110, a processor 120, a memory 130, an input/output interface 150, a display 160, and a communication interface 170. In some embodiments, the electronic device 101 may omit at least one of the above elements or may further include other elements.

The bus 110 may include, for example, a circuit for connecting the elements 110-170 and transferring communication (e.g., control messages and/or data) between the elements.

The processor 120 may include one or more of a Central Processing Unit (CPU), an Application Processor (AP), and a Communication Processor (CP). The processor 120, for example, may carry out operations or data processing relating to control and/or communication of at least one other element of the electronic device 101. An artisan understands and appreciates that a "processor" or "microprocessor" constitute hardware in the claimed invention. Under the broadest reasonable interpretation, the appended claims constitute statutory subject matter in compliance with 35 U.S.C. § 101. In addition, a processor as described herein may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc.

The processor 120 may receive, for example, an instruction from the above-described other elements (e.g., the memory 130, the I/O interface 150, the display 160, or the communication interface 170, etc.) via the bus 110, decipher the received instruction, and execute an operation or a data process corresponding to the deciphered instruction.

The memory 130 may include a volatile memory and/or a non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS). The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute only software per se.

The kernel 141 may control or manage system resources (e.g., the bus 110, the processor 120, or the memory 130 and/or other hardware and software resources) used for performing an operation or function implemented by the other programs (e.g., the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143, for example, may function as an intermediary for allowing the API 145 or the application programs 147 to communicate with the kernel 141 to exchange data. In addition, the middleware 143 may process one or more operation requests received from the application program 147 according to priority. For example, the middleware 143 may give priority to use the system resources of the electronic device 101 (for example, the bus 110, the processor 120, the memory 130, and the like) to at least one of the application programs 147. For example, the middleware 143 may perform scheduling or load balancing with respect to the one or more operation requests by processing the one or more operation requests according to the priority given to the at least one application program.

The API 145 is an interface through which the applications 147 control functions provided from the kernel 141 or the middleware 143, and may include, for example, at least one interface or function (e.g., instruction) for file control, window control, image processing, or text control.

The input/output interface 150, for example, may function as an interface that may transfer instructions or data input from a user or another external device to the other element(s) of the electronic device 101. Furthermore, the input/output interface 150 may output the instructions or data received from the other element(s) of the electronic device 101 to the user or another external device.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160, for example, may display various types of content (e.g., text, images, videos, icons, or symbols) for the user. The display 160 may include a touch screen and receive, for example, a touch, gesture, proximity, or hovering input using an electronic pen or the user's body part using capacitive, resistive, or another type of technology.

The communication interface 170, for example, may set communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. In addition, the wireless communication may include, for example, short range communication 164. The short-range communication 164 may be performed by using at least one of, for example, Wi-Fi, Bluetooth, Bluetooth low energy (BLE), Near Field Communication (NFC), and Global Navigation Satellite System (GNSS). The GNSS may include at least one of, for example, a Global Positioning System (GPS), a Global Navigation Satellite System (Glonass), a Beidou Navigation Satellite System (hereinafter referred to as "Beidou"), and a European Global Satellite-based Navigation System (Galileo), according to a use area, a bandwidth, or the like. Hereinafter, in the present disclosure, the "GPS" may be interchangeably used with the "GNSS". The wired communication may include at least one of, for example, a Universal Serial Bus (USB), a High Definition Multimedia Interface (HDMI), Recommended Standard 232 (RS-232), and a Plain Old Telephone Service (POTS). The network 162 may include at least one of a communication network such as a computer network (e.g., a LAN or a WAN), the Internet, and a telephone network.

Each of the first and second external electronic devices 102 and 104 may be of a type identical to or different from that of the electronic device 101. According to an embodiment, the server 106 may include a group of one or more servers. According to various embodiments, all or some of the operations performed in the electronic device 101 may be performed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (e.g., the electronic device 102 or 104 or the server 106) instead of performing the functions or services by itself or in addition. Another electronic apparatus may execute the requested functions or the additional functions, and may deliver a result of the execution to the electronic device 101. The electronic device 101 may process the received result as it is or additionally to provide the requested functions or services. To achieve this, for example, cloud computing, distributed computing, or client-server computing technology may be used.

Figure 2:
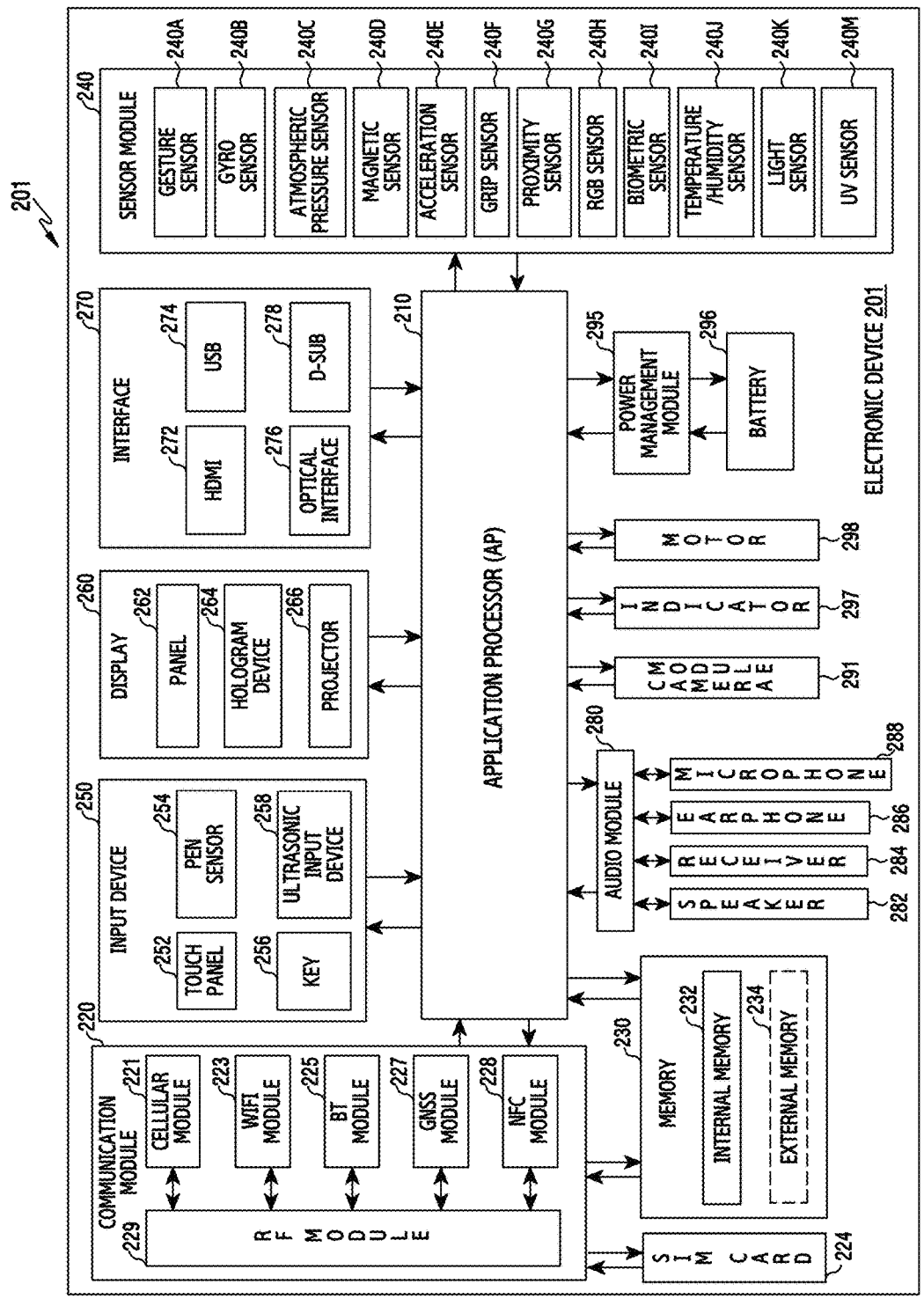
FIG. 2 is a block diagram of an electronic device according to various exemplary embodiments of the present disclosure.

FIG. 2 is a block diagram illustrating an electronic device according to various embodiments of the present disclosure.

FIG. 2 is a block diagram of an electronic device 201 according to various embodiments. For example, the electronic device 201 may include the whole or part of the electronic device 101 illustrated in FIG. 1. The electronic device 201 may include at least one processor (e.g., Application Processor (AP)) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program and perform processing of various pieces of data and calculations. The processor 210 may be implemented by, for example, a System on Chip (SoC). According to an embodiment, the processor 210 may further include a Graphic Processing Unit (GPU) and/or an image signal processor. The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store various data in a non-volatile memory.

The communication module 220 may have a configuration equal or similar to that of the communication interface 170 of FIG. 1. The communication module 220 may include, for example, the cellular module 221, a Wi-Fi module 223, a Bluetooth (BT) module 225, a Bluetooth low energy module 226, a GNSS module 227 (e.g., a GPS module, a Glonass module, a Beidou module, or a Galileo module), an NFC module 228, and a Radio Frequency (RF) module 229.

The cellular module 221 may provide a voice call, image call, a text message service, or an Internet service through, for example, a communication network. According to an embodiment, the cellular module 221 may distinguish between and authenticate electronic devices 201 within a communication network using a subscriber identification module (for example, the SIM card 224). According to an embodiment of the present disclosure, the cellular module 221 may perform at least some of the functions that the processor 210 may provide. According to an embodiment, the cellular module 221 may include a Communication Processor (CP).

Each of the Wi-Fi module 223, the BT module 225, the Bluetooth low energy module 226, the GNSS module 227, and the NFC module 228 may include, for example, a processor for processing data transmitted and received through the relevant module. According to some embodiments of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229 may transmit/receive, for example, a communication signal (for example, an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the Wi-Fi module 223, the BT module 225, the Bluetooth low energy module 226, the GNSS module 227, and the NFC module 228 may transmit and receive RF signals through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (for example, the memory 130) may include, for example, an internal memory 232 or an external memory 234. The embedded memory 232 and the external memory 234 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 234 may be functionally and/or physically connected to the electronic device 201 through various interfaces.

The sensor module 240 may measure a physical quantity or detect an operation state of the electronic device 201, and may convert the measured or detected information into an electrical signal. For example, the sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a Red/Green/Blue (RGB) sensor), a bio-sensor 240I, a temperature/humidity sensor 240J, a light sensor 240K, and an Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments of the present disclosure, the electronic device 201 may further include a processor configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use at least one of, for example, a capacitive type, a resistive type, an infrared type, and an ultrasonic type. Also, the touch panel 252 may further include a control circuit. The touch panel 252 may further include a tactile layer and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic wavers generated by an input tool through a microphone (for example, a microphone 288) and identify data corresponding to the detected ultrasonic waves.

The display 260 (for example, the display 160) may include a panel 262, a hologram device 264 or a projector 266. The panel 262 may include a configuration that is identical or similar to the display 160 illustrated in FIG. 1. The panel 262 may be implemented to be, for example, flexible, transparent, or wearable. The panel 262 and the touch panel 252 may be implemented as one module. The hologram 264 may show a three dimensional image in the air by using an interference of light. The projector 266 may display an image by projecting light onto a screen. The screen may be located, for example, inside or outside the electronic device 201. According to an embodiment, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-sub-miniature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may bilaterally convert, for example, a sound and an electrical signal. At least some elements of the audio module 280 may be included in, for example, the input/output interface 150 illustrated in FIG. 1. The audio module 280 may process sound information which is input or output through, for example, a speaker 282, a receiver 284, earphones 286, the microphone 288 or the like.

The camera module 291 is a device which may photograph a still image and a dynamic image. According to an embodiment, the camera module 291 may include one or more image sensors (for example, a front sensor or a back sensor), a lens, an Image Signal Processor (ISP) or a flash (for example, LED or xenon lamp).

The power management module 295 may manage, for example, power of the electronic device 201. According to an embodiment, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature during the charging. The battery 296 may include, for example, a rechargeable battery or a solar battery.

The indicator 297 may display a particular state (e.g., a booting state, a message state, a charging state, or the like) of the electronic device 201 or a part (e.g., the processor 210). The motor 298 may convert an electrical signal into mechanical vibration, and may generate vibration, a haptic effect, or the like. Although not illustrated, the electronic device 201 may include a processing unit (e.g., a GPU) for supporting a mobile television (TV). The processing unit for supporting mobile TV may, for example, process media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
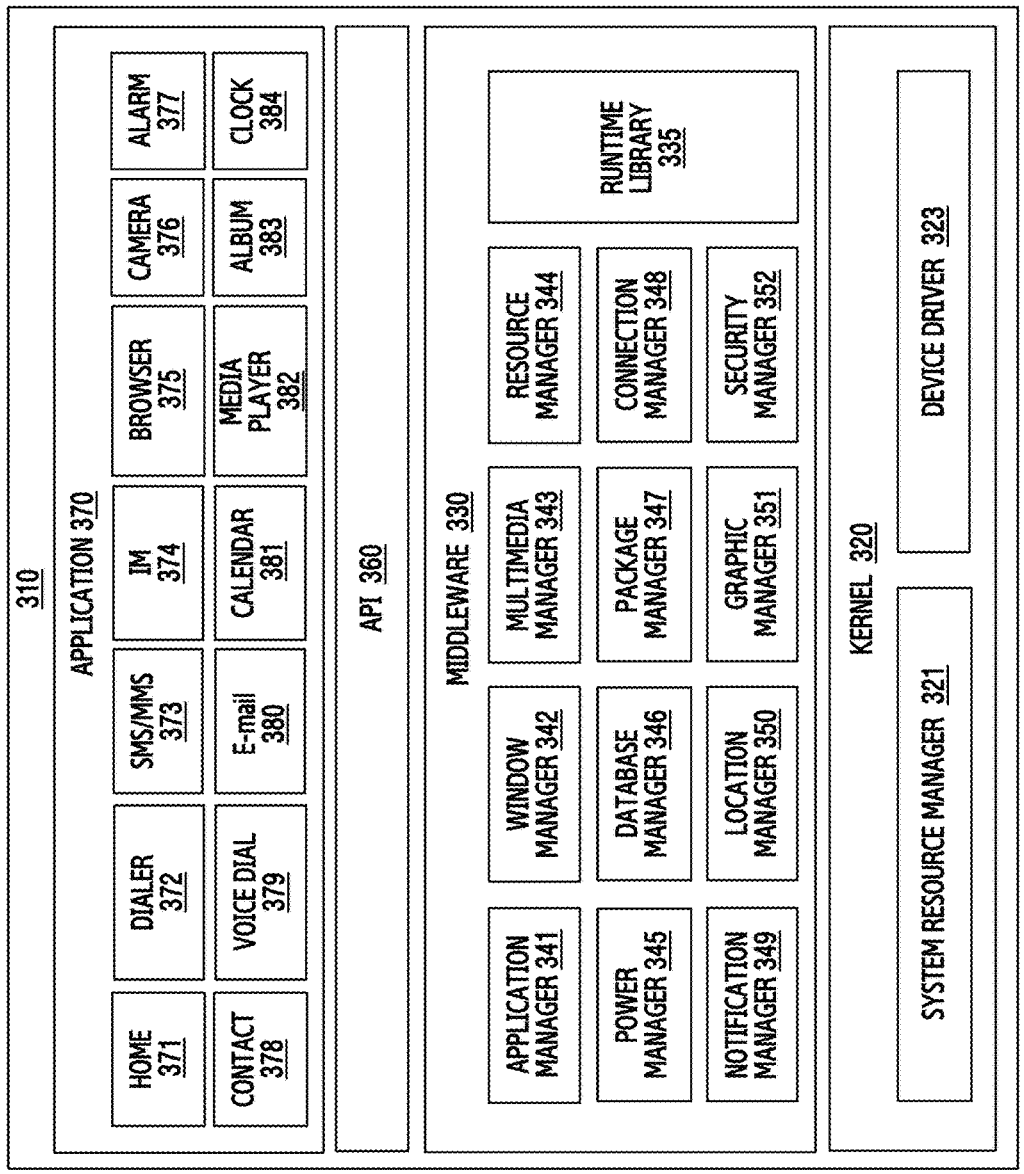
FIG. 3 is a block diagram of a program module according to various exemplary embodiments.

FIG. 3 is a block diagram of a program module according to various embodiments of the present disclosure.

According to an embodiment, the program module 310 (for example, the program 140) may include an Operating System (OS) for controlling resources related to the electronic device (for example, the electronic device 101) and/or various applications (for example, the application programs 147) executed in the operating system. The operating system may be, for example, Android, iOS, Windows, Symbian, Tizen, Bada, or the like.

The program module 310 may include a kernel 320, middleware 330, an API 360, and/or an application 370. At least some of the program module 310 may be preloaded on the electronic apparatus, or may be downloaded from an external electronic apparatus (e.g., the electronic device 102 or 104, or the server 106).

The kernel 320 (e.g., the kernel 141) may include, for example, a system resource manager 321 and/or a device driver 323. The system resource manager 321 may perform the control, allocation, retrieval, or the like of system resources. According to an embodiment of the present disclosure, the system resource manager 321 may include a process manager, a memory manager, a file system manager, or the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver. The middleware 330 may provide a function required by the applications 370 in common or provide various functions to the applications 370 through the API 360 so that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may perform input/output management, memory management, the functionality for an arithmetic function, or the like.

The application manager 341 may manage, for example, the life cycle of at least one of the applications 370. The window manager 342 may manage Graphical User Interface (GUI) resources used for the screen. The multimedia manager 343 may determine a format required to reproduce various media files, and may encode or decode a media file by using a coder/decoder (codec) appropriate for the relevant format. The resource manager 344 may manage resources, such as a source code, a memory, a storage space, and the like of at least one of the applications 370.

The power manager 345 may operate together with a Basic Input/Output System (BIOS) to manage a battery or power and may provide power information required for the operation of the electronic device. The database manager 346 may generate, search for, and/or change a database to be used by at least one of the applications 370. The package manager 347 may manage the installation or update of an application distributed in the form of a package file. The connectivity manager 348 may manage a wireless connection such as, for example, Wi-Fi or Bluetooth. The notification manager 349 may display or notify of an event, such as an arrival message, an appointment, a proximity notification, and the like, in such a manner as not to disturb the user. The location manager 350 may manage location information of the electronic apparatus. The graphic manager 351 may manage a graphic effect, which is to be provided to the user, or a user interface related to the graphic effect. The security manager 352 may provide various security functions required for system security, user authentication, and the like. According to an embodiment of the present disclosure, when the electronic apparatus (e.g., the electronic device 101) has a telephone call function, the middleware 330 may further include a telephony manager for managing a voice call function or a video call function of the electronic apparatus.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (for example, the application program 147) may include, for example, one or more applications which can provide functions such as home 371, dialer 372, SMS/MMS 373, Instant Message (IM) 374, browser 375, camera 376, alarm 377, contacts 378, voice dialer 379, email 380, calendar 381, media player 382, album 383, clock 384, health care (for example, measure exercise quantity or blood sugar), or environment information (for example, atmospheric pressure, humidity, or temperature information).

According to an embodiment of the present disclosure, the applications 370 may include an application (hereinafter, referred to as an "information exchange application" for convenience of description) supporting information exchange between the electronic apparatus (e.g., the electronic device 101) and an external electronic apparatus (e.g., the electronic device 102 or 104). The application associated with information exchange may include, for example, a notification relay application for forwarding specific information to an external electronic device, or a device management application for managing an external electronic device.

For example, the notification relay application may include a function of delivering, to the external electronic apparatus (e.g., the electronic device 102 or 104), notification information generated by other applications (e.g., an SMS/MMS application, an email application, a health care application, an environmental information application, etc.) of the electronic device 101. Further, the notification relay application may receive notification information from, for example, an external electronic device and provide the received notification information to a user.

The device management application may manage (for example, install, delete, or update), for example, a function for at least a part of the external electronic device (for example, the electronic device 102 or 104) communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment, the applications 370 may include applications (for example, a health care application of a mobile medical appliance or the like) designated according to attributes of the external electronic device 102 or 104. According to an embodiment of the present disclosure, the application 370 may include an application received from the external electronic apparatus (e.g., the server 106, or the electronic device 102 or 104). According to an embodiment of the present disclosure, the application 370 may include a preloaded application or a third party application which can be downloaded from the server. Names of the elements of the program module 310, according to the above-described embodiments of the present disclosure, may change depending on the type of OS.

According to various embodiments of the present disclosure, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

The module or the program module, according to various embodiments, may: include one or more elements described above; exclude some of them; or further include other elements. The operations performed by the module, the program module, or other elements, according to various embodiments, may be executed in a sequential, parallel, iterative, or heuristic method. In addition, some operations may be executed in a different order, or may be omitted, or other operations may be added. In addition, the embodiments disclosed in the present document are intended for the explanation and understanding of the technical matter, and shall not limit the scope of the technology described in the present document. Accordingly, the scope of the present disclosure should be construed to encompass all modifications or various other embodiments based on the technical concept of the present disclosure.

In addition, the embodiments disclosed in the present document are intended for the explanation and understanding of the disclosed technical matter, and shall not limit the scope of various embodiments of the present document. Therefore, the scope of various embodiments of the present document should be construed to encompass all modifications or various other embodiments based on the technical concept of the various embodiments of the present disclosure.

According to various exemplary embodiments of the present disclosure, an electronic device may include a memory for storing one or more instructions, and a processor. The processor may be configured for acquiring at least one image of at least one object, determining a change of an attribute corresponding to the at least one object, selecting at least one correction method based on the attribute change, correcting the at least one image using the at least one correction method, and displaying the at least one image corrected by the at least one correction method on a display.

In one exemplary embodiment, the electronic device may further include at least one camera module for acquiring the at least one image.

In one exemplary embodiment, the attribute may include a position, a distance, and/or a direction of the at least one image of the object or a combination thereof.

In one exemplary embodiment, the processor may be further configured for acquiring a first image of the object and a second image of the object; comparing the first image and the second image, and determining the attribute change o at least based in part on the comparison result.

In one exemplary embodiment, when the at least one image includes a plurality of objects, the processor is further configured to determine a representative object among the plurality of objects, and determine the attribute change corresponding to the representative object.

In one exemplary embodiment, in order to correct the at least one image using the at least one correction method, the processor may be further configured for configuring a distortion map, and determining a correction parameter corresponding to the distortion map.

In one exemplary embodiment, the processor may be further configured for acquiring a first and second image of the object, determining a first attribute value corresponding to the object from the first image, correcting the first image using a first correction method corresponding to the first attribute value, determining a second attribute value corresponding to the object from the second image, determining a speed at which the first attribute value changed to the second attribute value as the attribute change corresponding to the object, select a second correction method for the second image when the speed is within a predetermined range; and select a third correction method for the second image when the speed is not within the predetermined range.

In one exemplary embodiment, the third correction method may include correcting the first image using the first correction method and correcting the second image using the second correction method.

In one exemplary embodiment, the processor may be further configured for cropping at least one part of the at least one image.

In one exemplary embodiment, the processor may be configured for providing a preview of the corrected image by using the display.

Figure 4:
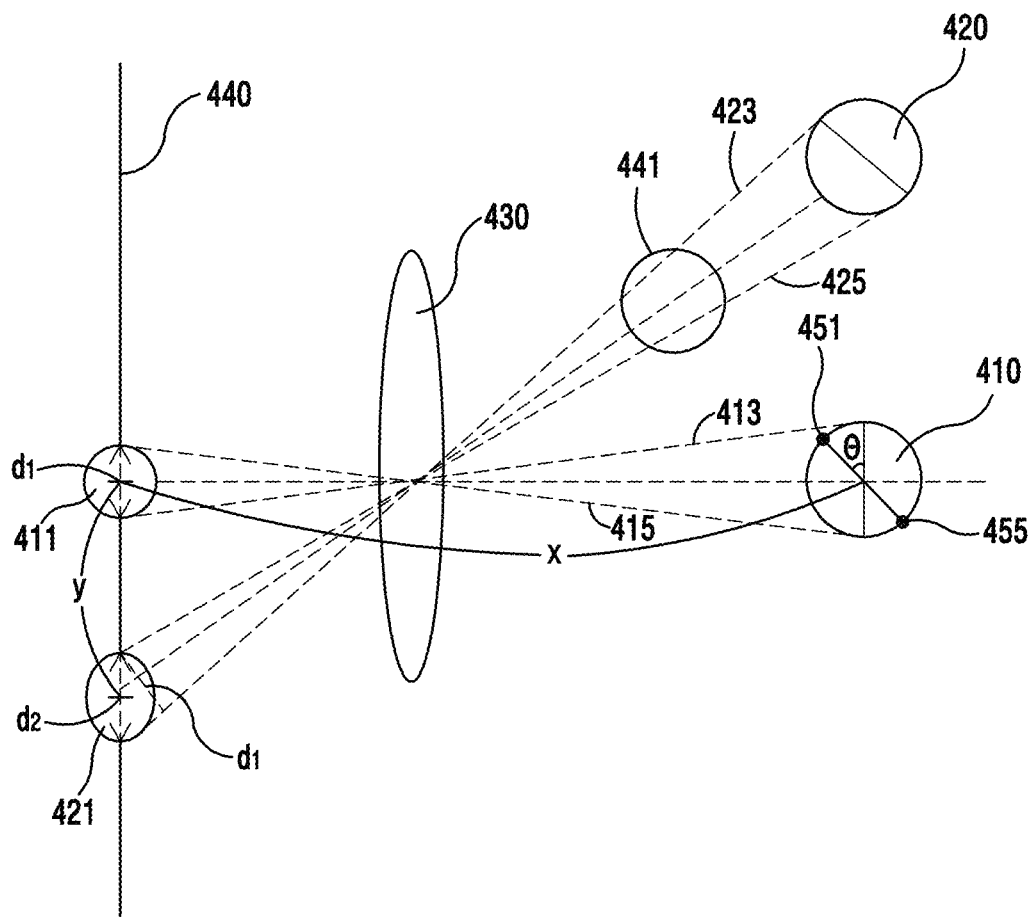
FIG. 4 illustrates a cause of an image distortion according to one exemplary embodiment of the present disclosure.

FIG. 4 illustrates a cause of an image distortion according to one exemplary embodiment of the present disclosure.

Hereinafter, referring to FIG. 4, a cause of an image distortion of an object will be described. The cause for the distortion may be based on at least one of a relative position of an object, a distance of the object (e.g., a focal distance or a depth), and/or a relative direction of the object in relation to the camera module 291.

Hereinafter, the term "attribute of an image region corresponding to an object" may refer to at least one of the position, distance, and/or direction of the object.

Depending on the relative position of the object in relation to the camera module 291 (or a relative position of an object in an angle of view of the camera), an image of the object may be distorted, and the level of distortion may be variable according to the position. For example, in case of an object 410, path lengths of optical beams 413 and 415 which pass through a lens 430 from the exterior of the object 410 may be identical. In one exemplary embodiment, if the path lengths of the optical beams which pass through the lens 430 from the exterior of the object 410 are identical, an image of the object (hereinafter, referred to as an "object image") 411 may not be distorted or the level of distortion may be small. In one exemplary embodiment, the object image 411 may be an object image located at a center of the entire image acquired by using the camera module 291. In another exemplary embodiment, in case of an object 420, path lengths of optical beams 423 and 425 which pass through the lens 430 from the exterior of the object 420 may be different. If the path lengths of the optical beams 423 and 425 which pass through the exterior of the object 420 are different, the object image 421 of the object 420 may be distorted. For example, comparing the object image 411 and the object image 421, even if the images have the same distance x from the objects 410 and 420 to the surface 440 forming the image, a length d2 of the object image 421 may be different from a length d1 of the object image 411, thereby indicating a distortion in the object image 421. In one exemplary embodiment, in case of the object image 421, a distortion may occur such that a length of the object image is increased in one axis of the object image, and the length of the object image is decreased in another axis. In one exemplary embodiment, the level of distortion may be increased in proportion to an increase in a distance y between object image positions.

Depending on the distance of the object from the camera module 291, the object image may be distorted, and the level of distortion may be variable according to the distance. For example, comparing the object 420 and an object 441, since an angle formed between optical beams which pass through the lens 430 from the exterior of the object 441 is greater than an angle formed between optical beams which pass through the lens 430 from the exterior of the object 420, an image of the object 441 may be more distorted than an image of the object 420. In one exemplary embodiment, even if objects have the same distance from the camera module 291, the level of distortion of the object image may vary depending on the distance of the object image from the center of the entire image acquired by camera module 291. In one exemplary embodiment, the distortion level of the object image may be increased in proportion to an increase in the distance of the object image. In one exemplary embodiment, the distance of the object image may vary depending on a distance between the object and the camera module 291. In one exemplary embodiment, the distance of the object image may be acquired by using at least one of a focal distance, Infrared rays (IR) sensor, and/or an ultrasonic sensor of the camera module 291.

In one exemplary embodiment, depending on the size of the object, the object image may be distorted, and the level of distortion may be variable according to the size. For example, at the same position, the distortion level of the object image may be increased in proportion to an increase in the size of the object.

Depending on a relative direction (or angle) of the object in relation to the camera module 291, the object image may be distorted, and the level of distortion may be variable according to the relative direction. If the relative direction of the object in relation to the camera module 291 changes, a distance between sub-objects (e.g. features in the objects) in the object from the camera module 291 may also change. For example, if a relative direction of the object 410 changes by an angle θ, the path length of the optical beam which passes through the lens 430 from point 455 may be different from the path length of the optical beam which passes through the lens 430 from another point 451. The region of the object image corresponding to point 451 may be enlarged, while the region of the object image corresponding to point 455 may be shrunk. If the relative direction of the object changes, an object image may be formed such that one sub-object in the object is enlarged and another sub-object is shrunk. For example, in case of a 3 dimensional object, e.g., a human face, depending on the direction (or angle) by which a user looks at the camera module 291, an image may be formed such that one part (or portion or sub-object) of the face is enlarged and another part is shrunk.

Figure 5A:
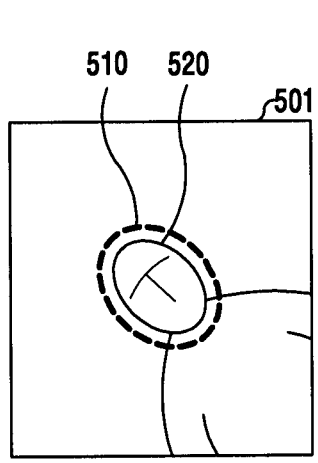
FIG. 5A, FIG. 5B and FIG. 5C are conceptual views illustrating an image processing method according to one exemplary embodiment of the present disclosure.
Figure 5B:
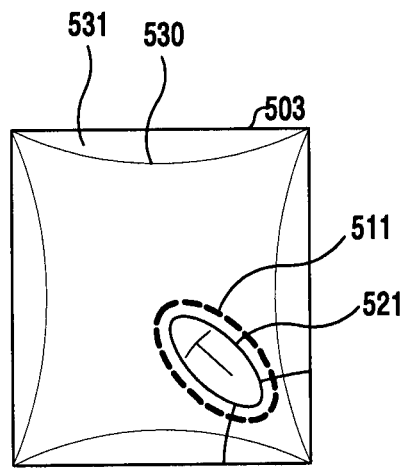
Figure 5C:
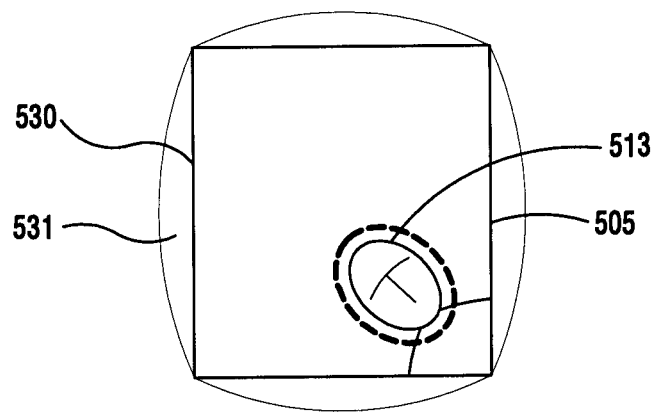

FIG. 5A to FIG. 5C are conceptual views illustrating an image processing method according to one exemplary embodiment of the present disclosure.

Referring to FIG. 5A to FIG. 5C, FIG. 5A illustrates an original image (i.e. the original image captured by camera module 291) in which an image 520 for an object is located at a center (or a middle) 510 of an entire image 501 (hereinafter, an original image) acquired by using the camera module 291. FIG. 5B illustrates an original image 503 in which an object image 521 is located at an edge 511 of the original image 503. FIG. 5C illustrates an image 505 in which an original image is corrected by including an object image 513.

In one exemplary embodiment, the original image may be a still image or a moving image.

In one exemplary embodiment, the object may be a human face. However, the present disclosure is not limited thereto. For example, the object may include an animal, a plant, a thing, or the like.

In one exemplary embodiment, the object image may include a feature (or a feature point) for recognizing the object image in the entire image acquired by using the camera module 291. For example, if the object is a human face, the object image may include a feature for recognizing the object image such as images for eyes, a noise, a mouth, a facial figure, or the like. However, the feature for recognizing the object image is not limited to the aforementioned examples.

The object image included in the entire image acquired by using the camera module 291 or the like may be distorted by various factors, as explained above in connection to FIG. 4. For example, the object image may be distorted based on at least one of a relative position of the object in relation to the camera module 291, a distance of the object (or a distance of the object relative to the camera module 291), and a relative direction of the object relative to the camera module 291. For example, comparing the outline of the object image of FIG. 5A to FIG. 5C, the object image may be distorted such that the outline of the object image 521 of FIG. 5B, where the object image is located at the edge of the original image, is increased in length in one direction, and is decreased in length in another direction than the outline of the object image 520 shown in FIG. 5A, where the object image is located at the center of the original image.

In FIG. 5A, since the object image 520 is located at the center of the entire image 501, the object image 502 may not be distorted or the distortion may be minimal. In FIG. 5B, since the object image 521 is located at the edge of the entire image 503, the object image may be distorted. For example, as shown in FIG. 5B, the object image 521 may be enlarged in one direction while shrunk in a second, perpendicular direction.

In one exemplary embodiment, the electronic device may configure a distortion map (e.g., 530 of FIG. 5B) to correct the distortion of the object image. In one exemplary embodiment, the electronic device may configure the distortion map by analyzing the distortion level of the object image. For example, assuming that FIG. 5A shows a case where the object image is not distorted, an outer contour of the distortion map may be matched to the outer contour of the entire image in FIG. 5A. If the object image 521 is distorted as shown in FIG. 5B, the distortion map 530 of FIG. 5B may be configured such that the outer contour of the distortion map is bent in a direction towards the center of the entire image. However, the present disclosure is not limited thereto. In one exemplary embodiment, the distortion map 530 may be configured by using digitized distortion levels of the object images.

In one exemplary embodiment, the distortion map 530 may be configured at least based on at least one of a relative position of an object relative to the camera module 291 (or a relative position of an object in an angle of view of the camera), a distance of the object relative to the camera module 291, and a relative direction of the object relative to the camera module 291.

In one exemplary embodiment, the processor 120 may adaptively determine the distortion map at least based on a change of an attribute of an image region corresponding to an object included in an original image. For example, referring to FIG. 5A and FIG. 5B, if the position of the object is changed from a position shown in FIG. 5A to a position shown in FIG. 5B, the distortion map (530 of FIG. 5B) may vary depending on the position change speed or the amount of change. For example, if the position change speed or the change amount is within a predetermined range, the processor 120 may determine the distortion map (530 of FIG. 5B) on the basis of a position or a time at which the original image of FIG. 5B is acquired. In another example, if the position change speed or the change amount does not fall within the predetermined range, the processor 120 may determine the distortion map on the basis of a position or a time at which the original image of FIG. 5A is acquired. In another example, on the basis of the position change speed or the change amount, a distortion map corresponding to a median (or an average) of the distortion map determined based on the time at which the original image of FIG. 5A is acquired and the distortion map determined based on the time at which the original image of FIG. 5B is acquired may be determined as the distortion map 530.

In one exemplary embodiment, FIG. 5C illustrates the image 505 in which the distorted object image 521 of FIG. 5B is corrected. In one exemplary embodiment, the distorted object image 521 may be corrected by applying a correction parameter (e.g., 620 of FIG. 6) to a distortion map (530 of FIG. 5B) including the distorted object image 521.

In one exemplary embodiment, if the correction parameter is applied to the distortion map (530 of FIG. 5B), the entire image can be corrected such that a distance of the distortion map 530 is equal to a distance of the entire image. For example, if a correction parameter (620 of FIG. 6A and FIG. 6B) is applied to the distortion map 530 of FIG. 5B, an image included in the distortion map 530 can be corrected such that an outermost border line of the distortion map 530 of FIG. 5B is matched to a boundary line of the entire image 505 of FIG. 5C.

In one exemplary embodiment, the object image can be corrected by applying the correction parameter (e.g., 620 of FIG. 6) to the distortion map 530. For example, the object image 513 of FIG. 5C may be identical or similar to the object image (520 of FIG. 5A) acquired through the camera module 291 so that the object image 513 appears same or similar to an object image that is located at a center of the entire image. For example, a shape of the outline of the object image 513 of FIG. 5C may be corrected to be identical or similar to the shape of the outline of the object image 520 of FIG. 5A.

In one exemplary embodiment, if the distortion map (530 of FIG. 5B) is corrected by the correction parameter, for example, if the correction is made such that an outermost border line of the distortion map 530 is matched to a boundary line of the entire image, a region (531 of FIG. 5B) formed between the boundary (503 of FIG. 5B) of the entire image before the correction and the outermost border line (530 of FIG. 5B) of the distortion map 530 may be formed after the correction. In one exemplary embodiment, the processor 120 may create the corrected image by cropping the region 531 shown in FIG. 5C.

Figures 6A, 6B:
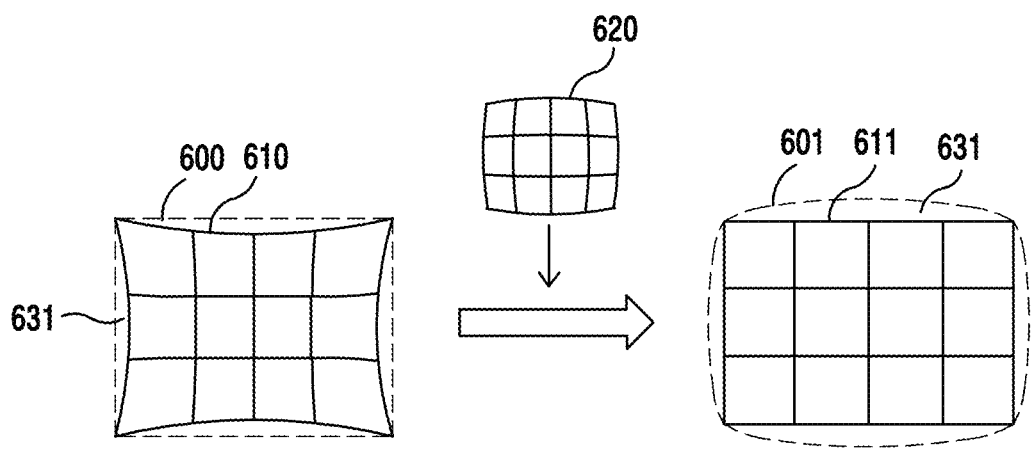
FIG. 6A and FIG. 6B illustrate an example of a method of correcting a distorted image according to an exemplary embodiment of the present disclosure.

FIG. 6A and FIG. 6B illustrate an example of a method of correcting a distorted image according to an exemplary embodiment of the present disclosure.

FIG. 6A illustrates an original image 600 and a distortion map 610. In one exemplary embodiment, the distortion map 610 may be configured based on at least one of a position, a distance, and/or a direction of an object. In another exemplary embodiment, the distortion map 610 may be configured by analyzing a distortion level of an object image.

In one exemplary embodiment, the processor 120 may adaptively determine the distortion map at least based on a change of an attribute of an image region corresponding to an object included in an original image. For example, if the attribute change speed or the change amount is within a predetermined range, the processor 120 may determine the distortion map on the basis of an attribute of the original image acquired at the current time. In another example, if the attribute change speed or the change amount is not within the predetermined range, the processor 120 may determine the distortion map on the basis of an attribute of a previously acquired original image. In another exemplary embodiment, the processor 120 may determine a distortion map corresponding to a median of a distortion map determined on the basis of the previously acquired original image and a distortion map determined on the basis of the original image at the current time as the distortion map.

In one exemplary embodiment, the distortion map 610 may have a grid form including a straight line or a curved line. However, the present disclosure is not limited thereto.

In one exemplary embodiment, the processor 120 may apply a correction parameter 620 corresponding to the distortion map 610 to an image acquired by using the camera module 291.

In one exemplary embodiment, for example, if the processor 120 applies the correction parameter 620 to the image 600 of FIG. 6A, as shown in FIG. 6B, the image may be corrected such that the outermost boundary line of the distortion map 610 is matched to the boundary 611 of the screen for outputting an image. In another example, if the correction parameter 620 is applied to the image 600 of FIG.

6A, as shown in FIG. 6B, the original image 600 may be changed to a corrected image 601. In one exemplary embodiment, if it is corrected such that the outermost boundary line of the distortion map (610 of FIG. 6A) is matched to the boundary 611 of the screen for outputting the image, an image portion (631 of FIG. 6B) between the acquired image 600 and the distortion map 610 may be located outside the boundary 611 of the screen. In one exemplary embodiment, the processor 120 may correct the distorted image by cropping the image portion (631 of FIG. 6B) located outside the boundary of the screen.

Figure 7:
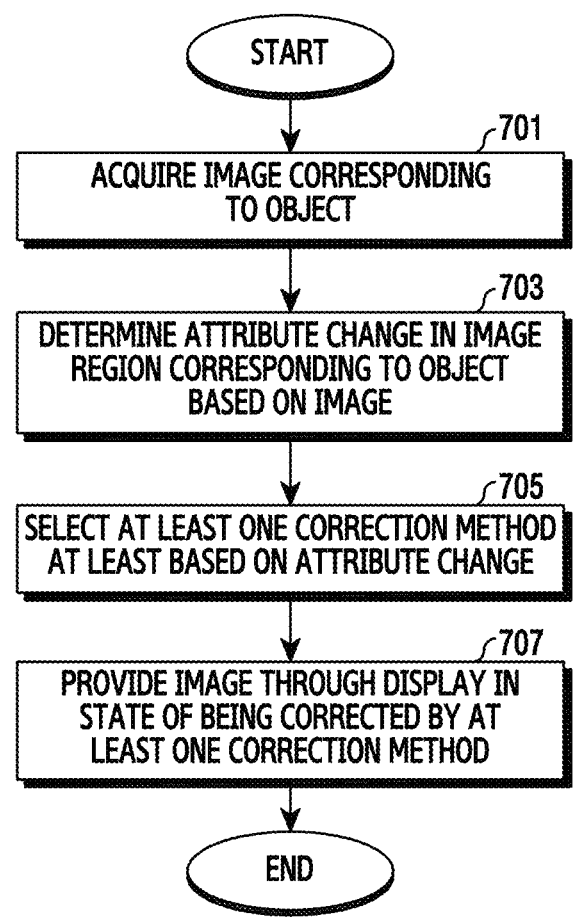
FIG. 7 is a flowchart illustrating an image processing method according to one exemplary embodiment of the present disclosure.

FIG. 7 is a flowchart illustrating an image processing method according to one exemplary embodiment of the present disclosure.

In operation 701, the processor 120 may acquire at least one image corresponding to an object. In one exemplary embodiment, the processor 120 may acquire the at least one image by using the camera module 291. For example, the processor 120 may acquire one image by receiving a one-time shutter input. In another example, the processor 120 may acquire a plurality of images through a preview mode or a live view mode of the camera module 291. In another example, the processor 120 may acquire a plurality of images photographed (or captured) continuously.

In operation 703, the processor 120 may determine a change of an attribute in an image region corresponding to the object at least based on the acquired image.

In one exemplary embodiment, the attribute of the image region corresponding to the object may be at least one of a position, a distance, and a direction of an object image. In one exemplary embodiment, the change of the attribute of the image region may be a change speed, change amount, or the like of the attribute of the image region.

In one exemplary embodiment, the processor 120 may determine a change of an attribute of an image region corresponding to the object at least based on a data change of a plurality of image frames acquired by using the camera module 291. For example, the processor 120 may determine an attribute of an image region corresponding to an object included in a first image frame, and may determine an attribute of an image region corresponding to an object included in a second image frame as a frame after the first image frame. In another example, the processor 120 may determine an attribute of an image region corresponding to an object included in a first image frame of a first time instance, and may determine an attribute of an image region corresponding to an object included in a second image frame of a second time instance after the first time instance.

In operation 705, the processor 120 may select at least one correction method among one or more correction methods on the basis of the change of the attribute.

In one exemplary embodiment, the processor 120 may confirm whether the change of the attribute is within a predetermined range. For example, the processor 120 may confirm whether a change of the attribute value, for example, a change speed or a change amount, is within the predetermined range.

In one exemplary embodiment, the processor 120 may compare the attribute value of the image region corresponding to the object included in the first image frame and the attribute value of the image region corresponding to the object included in the second image frame as the frame after the first image frame, and may determine a change of the attribute value (or the change speed or the change amount) at least one the basis of the comparison result.

In one exemplary embodiment, if it is determined that the change of the attribute is within the predetermined range, the processor 120 may select a correction method corresponding to the attribute value of the image region corresponding to the object included in the second image frame. For example, if it is determined that the change of the attribute is within the predetermined range, the processor 120 may select a method of correcting an original image at least based on the attribute value of the image region corresponding to the current time or the object included in the original image presently acquired.

In another exemplary embodiment, if it is determined that the change of the attribute does not fall within the predetermined range, the processor 120 may select a third correction method. For example, the third correction method may include using a correction method corresponding to the first image frame and a correction method corresponding to the second image frame after the first image frame. For example, the third correction method may be a correction method of selecting a correction parameter value corresponding to a median (e.g., an average) of a correction parameter to be applied to the first image frame and a correction parameter applied to the second image frame after the first image frame. However, the present disclosure is not limited thereto. For example, if the change of the attribute is greater than or equal to a predetermined value, the third correction method may be a correction method corresponding to the attribute value of the image region corresponding to the object included in the first image frame. In another example, the third correction method may be a correction method in which a combination rate of a correction parameter applied to the first image frame and a correction parameter applied to the second image frame after the first image frame, the combination rate varies depending on the change value (or the change level) of an attribute. For example, the correction parameters may be combined in a ratio of 2:1 when the change value (or the change level) of the attribute is changed only by ⅓ of a predetermined range (or a predetermined value).

In operation 707, the processor 120 may display at least one corrected image using the display 160 operatively coupled to the processor 120 in a state of being corrected by the at least one correction method.

In one exemplary embodiment, the processor 120 may display at least one corrected image in a preview mode or a live view mode. In another exemplary embodiment, at least one corrected captured image may be displayed.

Figure 8:
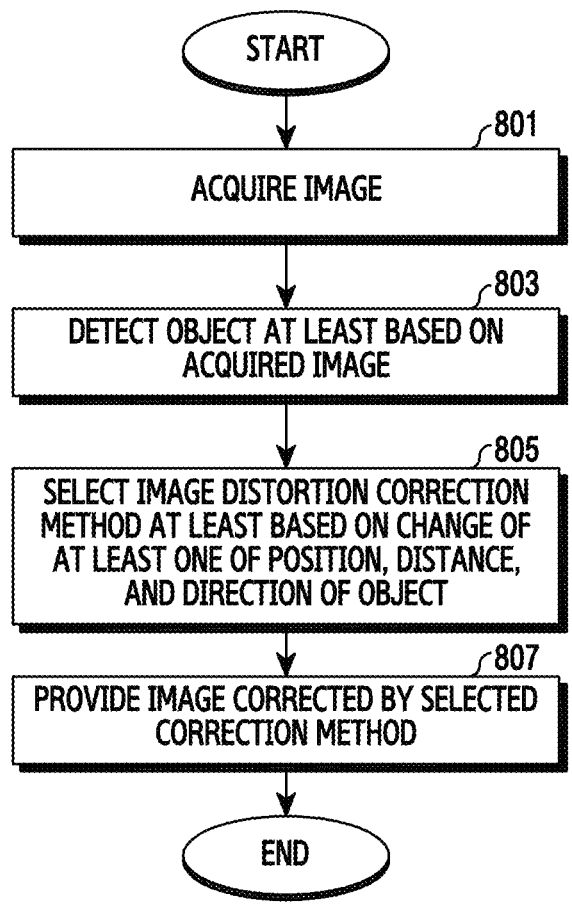
FIG. 8 is a flowchart illustrating an image processing method according to an exemplary embodiment of the present disclosure.

FIG. 8 is a flowchart illustrating an image processing method according to an exemplary embodiment of the present disclosure.

Referring to FIG. 8, in operation 801, the processor 120 may acquire an image by using the camera module 291. In one exemplary embodiment, the image acquired by using the camera module 291 may be a still image or a moving image. In one exemplary embodiment, if the image is acquired by using the camera module 291, the processor 120 may control the display 160 to output a preview image of the acquired image.

In another exemplary embodiment, the processor 120 may acquire from the memory 130 an image stored in the memory 130. In another exemplary embodiment, the processor 120 may acquire the image from an external device such as a server, another electronic device, or the like. However, an operation of acquiring the image by the processor 120 is not limited thereto.

In operation 803, in one exemplary embodiment, the processor 120 may detect an object (or an object image) at least based on the original image. In one exemplary embodiment, the processor 120 may acquire the object image from the original image. In one exemplary embodiment, the object may include a human face or the like. However, the present disclosure is not limited thereto. For example, the object may include an animal, a plant, a thing, or the like.

In one exemplary embodiment, the processor 120 may detect an object by extracting (or detecting) a feature of the object. For example, if the object is a human face, the processor 120 may extract an eye (or both eyes), noise, mouth, facial contour, or the like of the human face by using a face recognition algorithm or program. In one exemplary embodiment, the processor 120 may extract an exterior of the object. For example, the processor 120 may extract the exterior of the object by analyzing differences such as hue, saturation, brightness, or the like between the object image and the background. However, an operation of detecting the object or an algorithm or program for extracting the object or the feature of the object is not limited thereto.

In operation 805, the processor 120 may select an image distortion correction method at least based on a change of an attribute of the object, for example, at least one of a position, a distance, and/or a direction of the object.

In one exemplary embodiment, the processor 120 may determine whether the change of the attribute is within a predetermined range. For example, the processor 120 may determine whether a change of the attribute value, for example, a change speed or a change amount of an image region corresponding to the object, is within the predetermined range.

In one exemplary embodiment, the processor 120 may compare an attribute value of an image region corresponding to the object included in the first image frame and an attribute value of an image region corresponding to the object included in the second image frame as the frame after the first image frame, and may determine a change of the attribute value (or the change speed or the change amount) based at least on the comparison result.

In one exemplary embodiment, if it is determined that the change of the attribute is within the predetermined range, the processor 120 may select a correction method corresponding to the attribute value of the image region corresponding to the object included in the second image frame. As another example, if it is determined that the change of the attribute is within the predetermined range, the processor 120 may select a method of correcting an original image at least based on the attribute value of the image region corresponding to the current time or the object included in the presently acquired original image.

In another exemplary embodiment, if it is confirmed that the change of the attribute does not belong to the predetermined range, the processor 120 may select a third correction method. For example, the third correction method may include using a first correction method corresponding to the first image frame and a second correction method corresponding to the second image frame after the first image frame. For example, the third correction method may include selecting a correction parameter value corresponding to a median (e.g., an average) of a first correction parameter applied to the first image frame and a second correction parameter applied to the second image frame after the first image frame. However, the present disclosure is not limited thereto. For example, if the change of the attribute is greater than or equal to a predetermined value, the third correction method may be a correction method corresponding to the attribute value of the image region corresponding to the object included in the first image frame. In another example, the third correction method may include a combination of a first correction parameter applied to the first image frame and a second correction parameter applied to the second image frame after the first image frame, the combination rate varies depending on a change value (or a change level) of an attribute. For example, the correction parameters may be combined in a ratio of 2:1 when the change value (or the change level) of the attribute is changed only by ⅓ of a predetermined range (or a determined value).

In operation 807, the processor 120 may provide an image corrected by the selected correction method, i.e. display the image.

In one exemplary embodiment, the processor 120 may display at least one corrected image in a preview mode or a live view mode. In another exemplary embodiment, at least one corrected captured image may be displayed.

Figure 9:
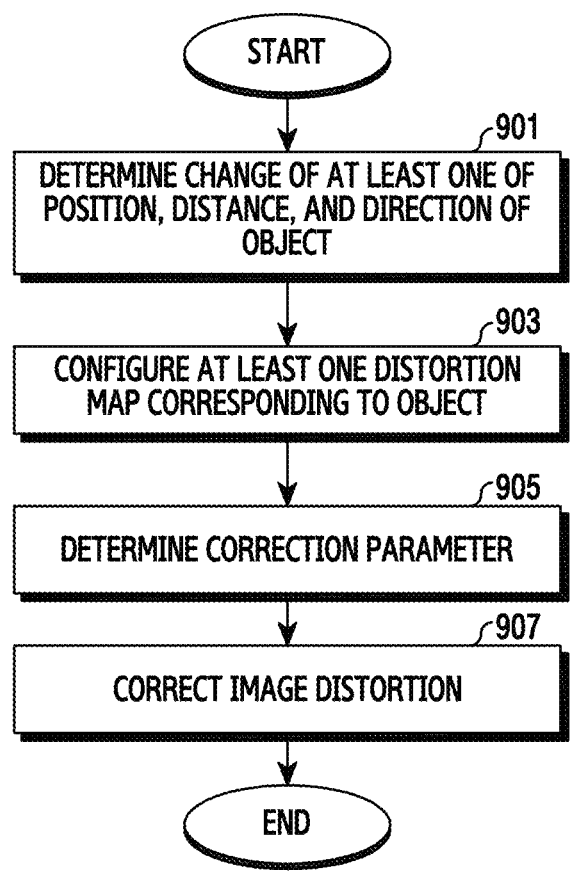
FIG. 9 is a flowchart illustrating a method of correcting a distorted image according to an exemplary embodiment of the present disclosure.

FIG. 9 is a flowchart illustrating a method of correcting a distorted image according to an exemplary embodiment of the present disclosure.

Referring to FIG. 9, in operation 901, the processor 120 may determine a change of at least one of a position, a distance, and a direction of an object in an original image.

In one exemplary embodiment, in order to determine the change of at least one of the position, a distance, and/or a direction of the object, the processor 120 may determine a position, a distance, and/or a direction of an object included in an image acquired at a first time and a position, a distance, and a direction of an object included in an image acquired at a second time after the first time.

In one exemplary embodiment, the processor 120 may determine a relative position of a object image with respect to a center of an original image acquired at the first time and the second time. In one exemplary embodiment, if a coordinate system is determined on a screen for displaying an image, the center of the original image may correspond to a center point (or a middle) of the determined coordinate system (e.g., a pixel coordinate system). In another exemplary embodiment, if the coordinate system is determined on the screen for displaying the image, the processor 120 may determine a location coordinate at which an object image is located in the determined coordinate system. In one exemplary embodiment, the processor 120 may determine a position of an object image at least based on a feature of an object. For example, if the object is a human face, the processor 120 may determine a point at which a straight line for connecting both eyes of the face and a straight line for forming a symmetry axis of a nose as the position of the object image. In another exemplary embodiment, the processor 120 may determine a center of gravity of the object image as the position of the object image. For example, the processor 120 may determine an average value of coordinates (e.g., pixel coordinates) included in the object image as the position of the object image. In another exemplary embodiment, the processor 120 may determine an average of coordinate points corresponding to the exterior of the object image as the position of the object image. However, the present disclosure is not limited thereto.

In one exemplary embodiment, the processor 120 may determine a distance of the object included in the image acquired at the first time and the second time after the first time. For example, the processor 120 may acquire information regarding a coordinate of points for forming the exterior of the object image. The processor 120 may determine an area formed by the exterior of the object image using the coordinate of points that forms the exterior. In one exemplary embodiment, the processor 120 may determine the area formed by the exterior of the object image as a distance of the object image. In another exemplary embodiment, the processor 120 may determine two coordinate points capable of forming a longest line segment among coordinates of the points for forming the exterior of the object image, and may determine the longest line segment formed by the determined two coordinate points as the distance of the object image. However, the present disclosure is not limited thereto.

In one exemplary embodiment, the processor 120 may determine a relative direction of the object included in the image acquired at the first time and the second time in relation to the camera module 291.

In one exemplary embodiment, the processor 120 may determine the relative direction by using a sensor such as an accelerometer (e.g., an acceleration sensor 240E), a gyroscope (e.g., a gyro sensor 240B), or the like. For example, the processor 120 may be in a direction in which the electronic device forms 90° against the ground, where the electronic device is capable of capturing an object from a front view in a reference direction. If the electronic device rotates, or rotates and moves, for example, from the reference direction, the processor 120 may determine a change of an amount of rotation, or rotation and movement, of the electronic device by using a sensor such as the accelerometer, the gyroscope, or the like. The processor 120 may determine a relative direction of an object at least based on the determined amount of the change of the rotation, or the rotation and movement, of the electronic device.

In another exemplary embodiment, the processor 120 may determine the relative direction of the object relative to the camera module 291 on the basis of the feature of the object. For example, if the object is a human face, the relative direction of the human face may be determined on the basis of a distance between both eyes (e.g., an eye's outline or iris distance). However, the present disclosure is not limited thereto.

In one exemplary embodiment, the processor may determine a change (or a change speed or a change amount) by comparing an attribute of images acquired at the first time and the second time after the first time.

In operation 903, the processor may configure at least one distortion map corresponding to the object.

The processor 120 may configure the distortion map at least based on a change of at least one of the position, a distance, and/or a direction of the object. In another exemplary embodiment, the processor 120 may configure the distortion map by considering a distortion change level of the object image.

In one exemplary embodiment, the processor 120 may determine whether the change of the attribute is within a predetermined range. For example, the processor 120 may determine whether a change of the attribute value, for example, a change of an attribute value (or a change speed, or a change amount) of an image region corresponding to the object, is within the predetermined range.

In one exemplary embodiment, the processor 120 may compare an attribute value of an image region corresponding to the object included in the first image frame and an attribute value of an image region corresponding to the object included in the second image frame as the frame after the first image frame, and may determine a change of the attribute value (or the change speed or the change amount) based at lease on the comparison result.

In one exemplary embodiment, if it is determined that the change of the attribute is within the predetermined range, the processor 120 may select a correction method corresponding to the attribute value of the image region corresponding to the object included in the second image frame. For example, if it is determined that the change of the attribute is within the predetermined range, the processor 120 may select a method of correcting an original image at least based on the attribute value of the image region corresponding to a current time or the object included in the presently acquired original image.

In another exemplary embodiment, if it is confirmed that the change of the attribute does not fall within the predetermined range, the processor 120 may select a third correction method. For example, the third correction method may include using a correction method corresponding to the first image frame and a correction method corresponding to the second image frame after the first image frame. For example, the third correction method may be a correction method of selecting a distortion map corresponding to a median (e.g., an average) of a distortion map to be configured to the first image frame and a distortion map to be configured to the second image frame after the first image frame. However, the present disclosure is not limited thereto. For example, if the change of the attribute is greater than or equal to a predetermined value, the third correction method may be a correction method corresponding to the attribute value of the image region corresponding to the object included in the first image frame. In another example, the third correction method may be a correction method in which a combination of a distortion map to be used for the first image frame and a distortion map to be used for the second image frame after the first image frame, the combination varies depending on the change value (or the change level) of an attribute. For example, the combination may be combined in a ratio of 2:1 when the change value (or the change level) of the attribute is changed only by ⅓ of a predetermined range (or a predetermined value).

In one exemplary embodiment, if an attribute value of an image region corresponding to an object is within a predetermined range, the processor 120 may configure a distortion map in a form of a function having a variable selected from at least one of a position, a distance, a direction, and the like of an object image included in an presently acquired original image. In another exemplary embodiment, the processor 120 may configure at least one of the position, distance, direction, and the like of the object image as the variable, and may store a value (or a distortion value) corresponding to at least one of the position, distance, direction, and the like of the object image and configured as the variable into the memory 130 in a table form. In another exemplary embodiment, the processor 120 may configure the distortion map by digitizing the distortion level for a region included in the distortion map.

In one exemplary embodiment, the processor 120 may configure a distortion map by weighting at least one of the position, distance, direction, and the like of the object image.

In one exemplary embodiment, the processor 120 may configure a distortion map having a grid including a straight line or a curved line to indicate a distortion level of the acquired object image. However, the present disclosure is not limited thereto.

In operation 905, the processor may determine a correction parameter.

In one exemplary embodiment, the processor 120 may determine a correction parameter for compensating for the distortion map. In another exemplary embodiment, the processor 120 may determine a correction parameter which allows an boundary of the distortion map to be identical to the boundary of the screen for outputting an image (or an image to be output). In another exemplary embodiment, the processor 120 may determine a correction parameter which allows an outermost border line of the distortion map to be matched to a boundary of the screen for outputting the image.

In operation 907, the processor may correct a distortion of the image.

In one exemplary embodiment, the processor 120 may correct the distortion of the acquired image by applying the determined correction parameter to the distortion map. For example, if the processor 120 applies the correction parameter to the original image, the size of the distortion map may be identical to the size of the screen for outputting the image (or the image to be output through the display). In another example, if the processor 120 applies the correction parameter to the original image, the outermost border line of the distortion map may be matched to the boundary of the screen for outputting the image. In another exemplary embodiment, the processor 120 may change a coordinate corresponding to an image included in the distortion map into a coordinate corresponding to a display screen by applying the correction parameter to the original image.

In one exemplary embodiment, in order to correct the distortion of the original image, the processor 120 may crop at least a part of the corrected image. For example, if the correction parameter is applied to the original image, the processor 120 may crop an image portion to be located outside the screen for outputting the image. In another example, the processor 120 may crop an image portion other than an image portion corresponding to the distortion map (or an image portion included in the distortion map) in the original image.

Figure 10A:
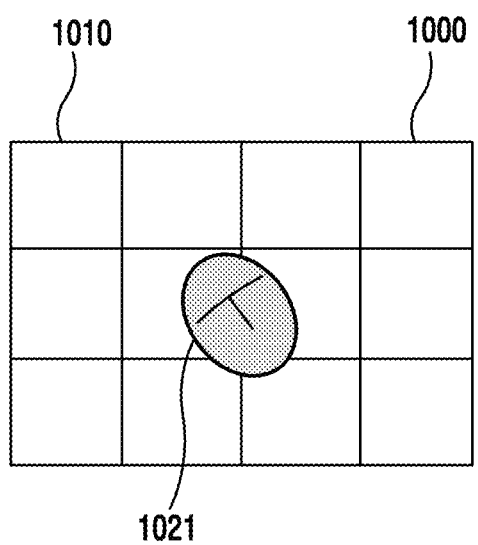
FIG. 10A and FIG. 10B illustrate an example of a method of correcting a distorted image at least based on a position of an object according to an exemplary embodiment of the present disclosure.
Figure 10B:
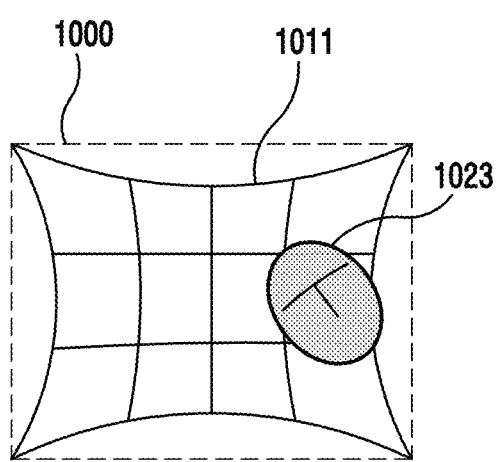

FIG. 10A and FIG. 10B illustrate an example of a method of correcting a distorted image at least based on a position of an object according to an exemplary embodiment of the present disclosure.

In one exemplary embodiment, if the processor 120 determines that an object image is not distorted, a distortion map 1010 may be configured for example as shown in FIG. 10A. For example, if an object image 1021 is located at a center of an image 1000, the processor may configure the distortion map 1010 to have a grid in which lines constituting the distortion map 1010 are straight lines.

In one exemplary embodiment, the processor may configure a distortion map which varies depending on a distortion level of the object image. For example, when the distortion level of the object image is greater, for example, as shown in FIG. 10B, because an object image 1023 is located at an edge position of the image 1000, the processor may configure a distortion map 1011 such that lines constituting the distortion map 1011 are bent in a direction towards a center of the image 1000.

Although a case where the object image is located in a right side in an image acquired through a camera module is exemplified in one exemplary embodiment, the present disclosure is not limited thereto.

Figure 11C:
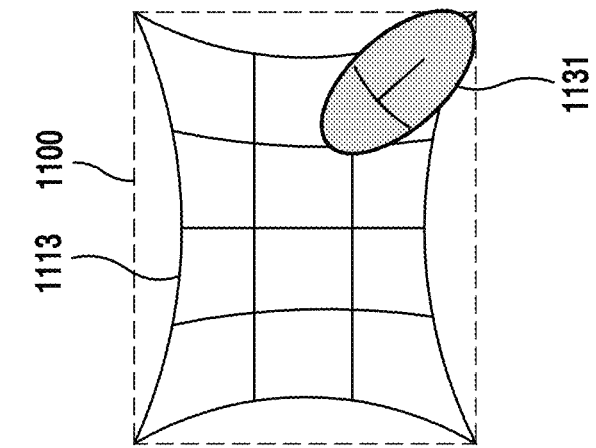
FIG. 11A, FIG. 11B and FIG. 11C illustrate an example of a method of correcting a distorted image at least based on a distance of an object according to an exemplary embodiment of the present disclosure.
Figure 11B:
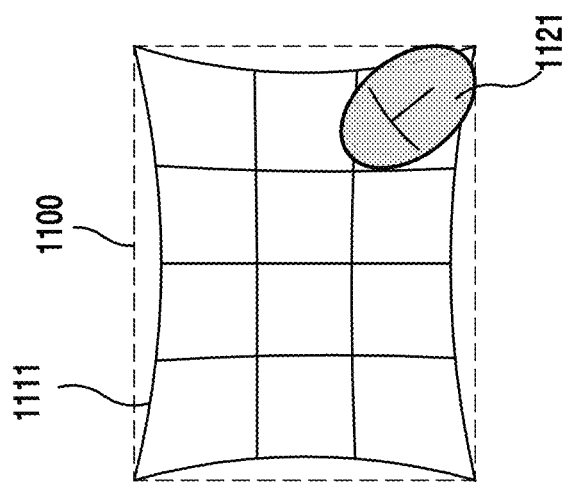
Figure 11A:
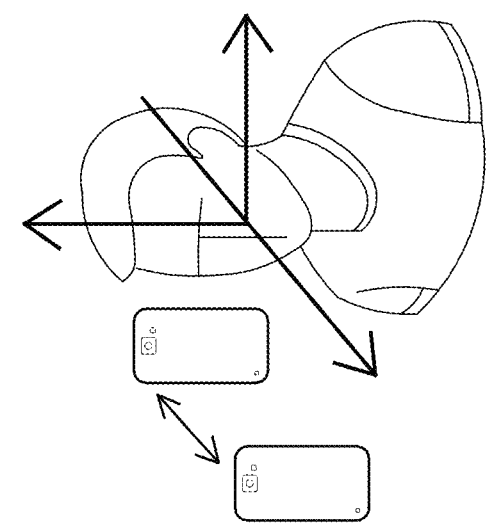

FIG. 11A to FIG. 11C illustrate an example of a method of correcting a distorted image at least based on a distance of an object according to an exemplary embodiment of the present disclosure.

Referring to FIG. 11A to FIG. 11C, as shown in FIG. 11A, an image of an object included in an original image to be acquired may vary depending on the distance between the object and the electronic device.

In one exemplary embodiment, the processor 120 may configure a distortion map at least based on a distance of the object.

For example, comparing FIG. 11B and FIG. 11C, if object images 1121 and 1131 in an image have the same position (e.g., pixel coordinate), the processor 120 may determine that the smaller the distance attribute value (e.g., a focal distance or a depth) corresponding to the object (e.g., the closer the distance of the object is to a camera), the greater the distortion level of the image. In one exemplary embodiment, the processor 120 may configure a distortion map such that the smaller the distance attribute value corresponding to the object (e.g., the focal distance or the depth), the more the lines constituting the distortion map are bent with respect to a center of the image. For example, even if the object image is located at the same position in an entire image 1100, the processor 120 may configure the distortion map such that a distortion map 1113 for the object image 1131 is more bent in comparison with a distortion map 1111 for the object image 1121, when the object image 1131 in FIG. 11C corresponds to the object being closer to the camera than in FIG. 11B.

Figure 12C:
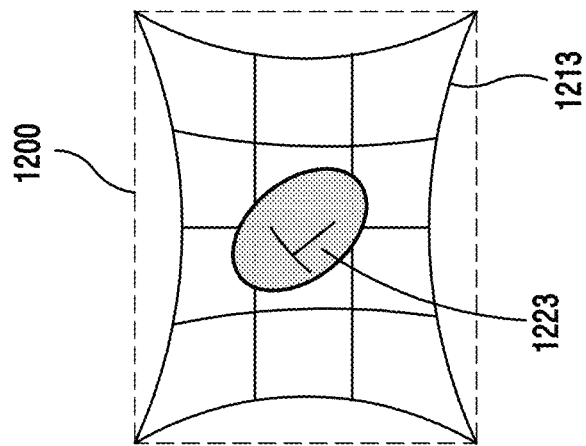
FIG. 12A, FIG. 12B and FIG. 12C illustrate an example of a method of correcting a distorted image at least based on a direction of an object according to an exemplary embodiment of the present disclosure.
Figure 12B:
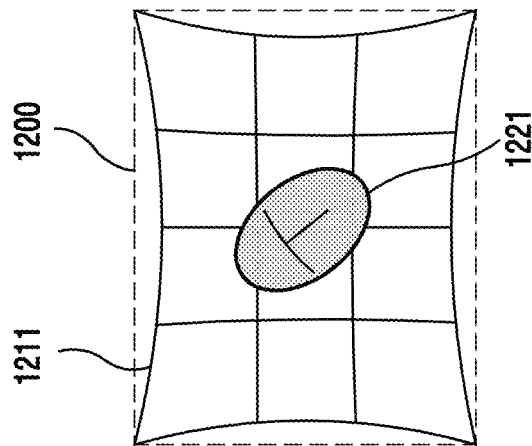
Figure 12A:
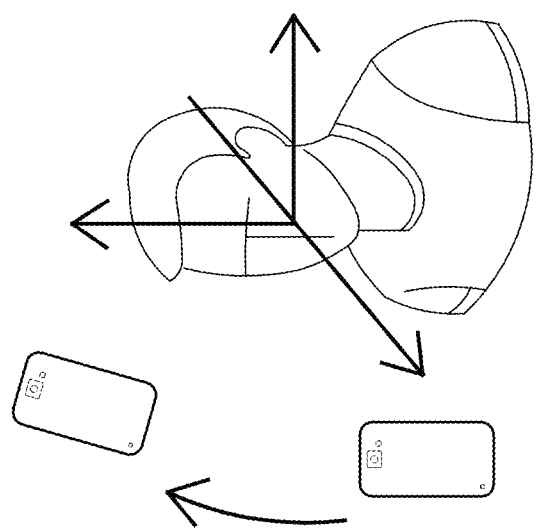

FIG. 12A to FIG. 12C illustrate an example of a method of correcting a distorted image at least based on a direction of an object according to an exemplary embodiment of the present disclosure.

In one exemplary embodiment, as shown in FIG. 12A, the electronic device 101 may rotate or may rotate and move in various directions.

In one exemplary embodiment, the processor 120 may configure a distortion map at least based on the direction of the object.

In one exemplary embodiment, comparing FIG. 12B and FIG. 12C, if an object image is located at a center of an image acquired by using the camera module 291, the distortion map may be configured differently according to a direction of the object image. For example, if the object is a human face, in a state where the electronic device is perpendicular to the ground and a direction capable of capturing a face from a front of the electronic device is configured as a reference direction, the processor 120 may determine that the greater the rotation angle of the camera module 291, the greater the distortion level of the image. In one exemplary embodiment, the processor 120 may configure a distortion map such that the greater the rotation angle of the camera module 291, the more the lines constituting the distortion map are bent with respect to a center of an image acquired by using the camera module 291. For example, if an object image 1223 of FIG. 12C has a greater rotation angle than an object image 1221 of FIG. 12B, the processor 120 may configure the distortion map such that a distortion map 1213 is more bent in a center direction of an entire image 1200 in comparison with a distortion map 1211.

Figure 13:
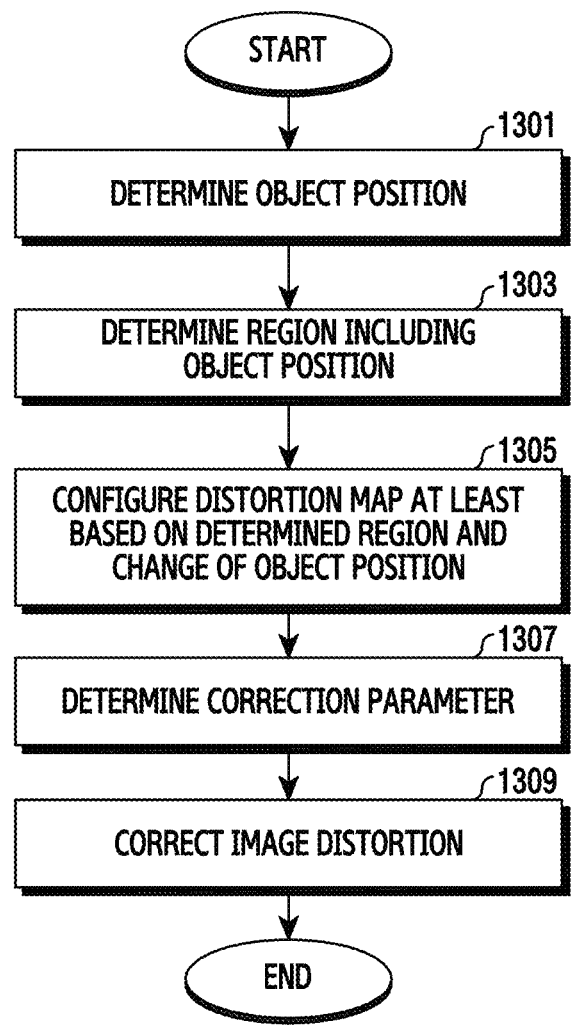
FIG. 13 is a flowchart illustrating a method of correcting a distorted image at least based on a position of an object according to another exemplary embodiment of the present disclosure.

FIG. 13 is a flowchart illustrating a method of correcting a distorted image at least based on a position of an object according to another exemplary embodiment of the present disclosure.

FIG. 14A to FIG. 14C, FIG. 15A, and FIG. 15B illustrate examples of a method of correcting a distorted image at least based on a position of an object according to another exemplary embodiment of the present disclosure.

Referring to FIG. 13 to FIG. 15, in operation 1301, the processor 120 may determine a position of an object included in an image acquired at a first time and a second time after the first time.

In operation 1303, the processor 120 may determine a region including a position of an object image from each of the images acquired at the first time and the second time after the first time.

In one exemplary embodiment, the processor 120 may divide and determine a region for displaying an image acquired by using the camera module 291 into a plurality of regions. For example, in FIG. 14A, the processor 120 may divide and determine a region for displaying an image 1400 acquired by using the camera module 291 into a region 1401 and a region 1403.

However, a method of dividing and determining the plurality of regions by the processor 120 is not limited thereto. For example, as shown in FIG. 15A, the processor 120 may divide and determine an image 1500 acquired by using the camera module 291 into a region 1501 and a region 1503. In another example, as shown in FIG. 15B, the processor 120 may determine a region for displaying the image 1500 acquired by using the camera module 291 into the plurality of regions 1501 to 1505, so that the image 1500 is divided into more regions than the images in FIG. 14A or FIG. 15A. However, without being limited thereto, the processor 129 may divide and determine a region for displaying an image acquired by using the camera module 291 into a plurality of regions in various manners not explicitly disclosed herein.

In one exemplary embodiment, the processor 120 determine a region including a position of an object image from each of the images acquired at the first time and the second time after the first time among a plurality of regions. For example, the processor 120 may determine a region corresponding to a location coordinate of an object image among the plurality of regions.

In operation 1305, the processor 120 may configure a distortion map at least based on the region determined in operation 1303 and a change of a position of the object.

Figures 14A, 14B, 14C:
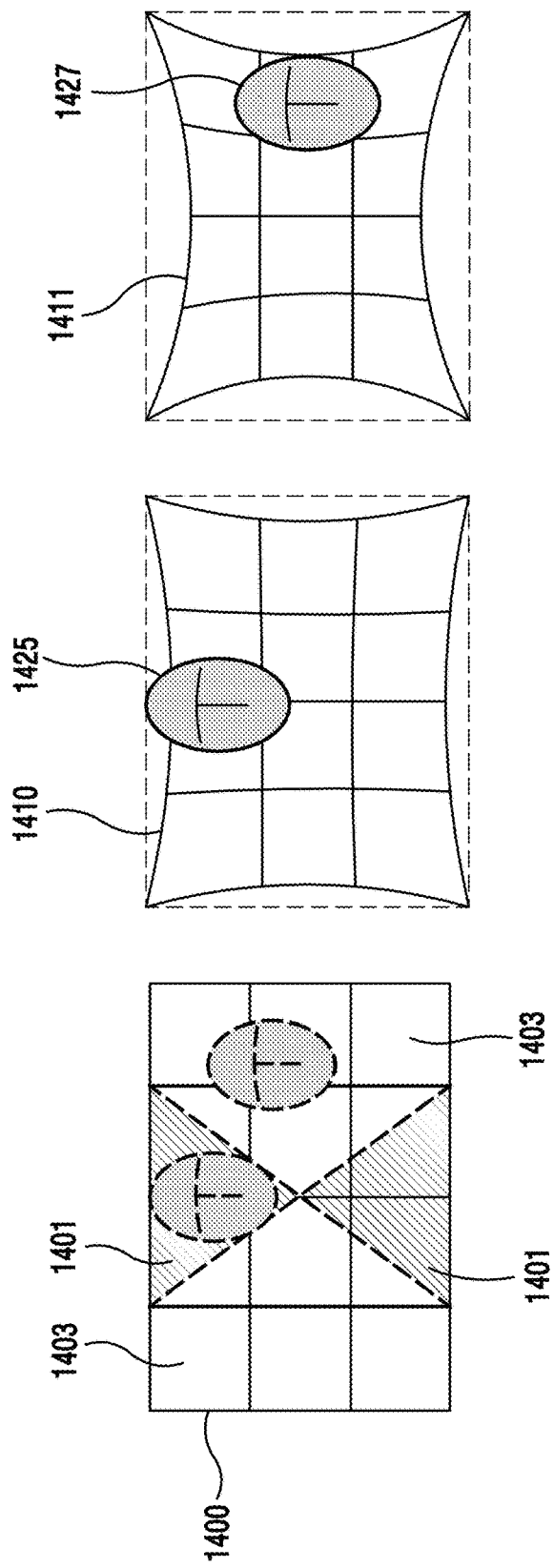
FIG. 14A, FIG. 14B, FIG. 14C, FIG. 15A, and FIG. 15B illustrate examples of a method of correcting a distorted image at least based on a position of an object according to another exemplary embodiment of the present disclosure.
Figure 15A:
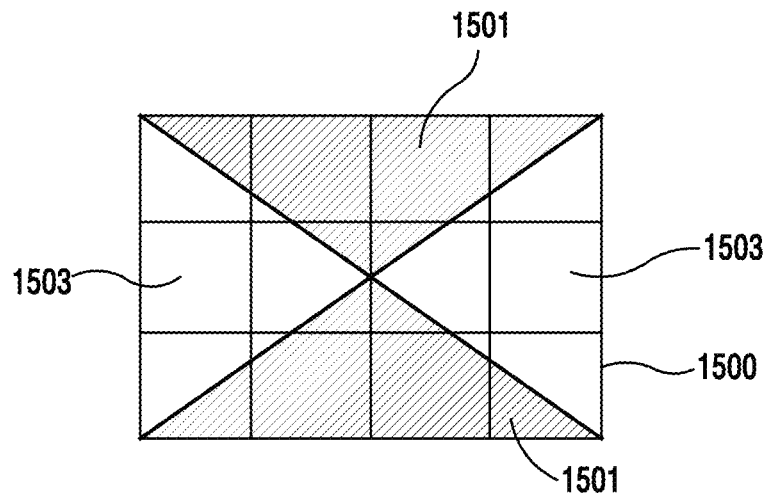
Figure 15B:
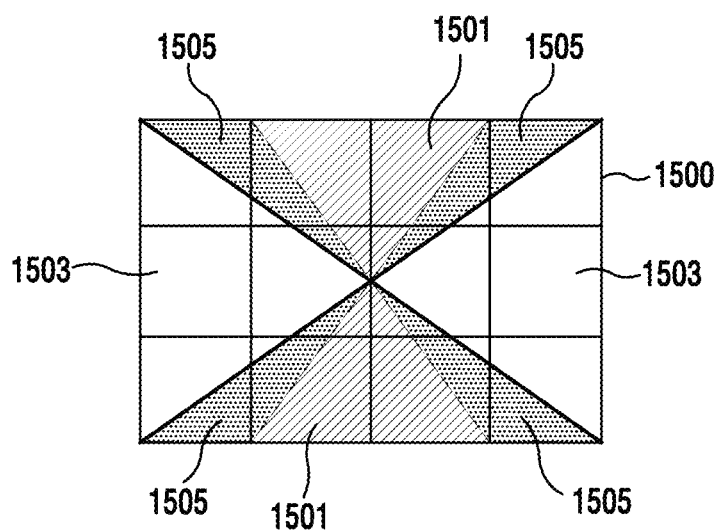

For example, in FIG. 14B and FIG. 14C, if object images 1425 and 1427 are located in the same distance from a center of the entire image 1400 acquired by using the camera module 291, the processor 120 may differently configure a distortion map according to a change of a region including the object image. For example, in a case where the object image 1427 is changed to the region 1403, the processor 120 may determine that the distortion change level of the image is greater in comparison with a case where the object image 1425 is changed to the region 1401. As another example, the processor 120 may determine that the case of FIG. 14B has a greater change in an attribute of an object in comparison with the case of FIG. 14C, and may configure such that a distortion map is more bent in a center direction of an original image in case of FIG. 14C. For example, the processor 120 may configure the distortion map such that a numeric number corresponding to a distortion map 1411 of FIG. 14C is closer to a center coordinate value of the entire image in comparison with a numeric number corresponding to a distortion map 1410 of FIG. 14B.

In operation 1307, the processor 120 may determine a correction parameter for the distortion map.

In operation 1309, the processor 120 may correct a distortion of the image acquired by using the camera module 291 at least based on the determined correction parameter.

Figure 16:
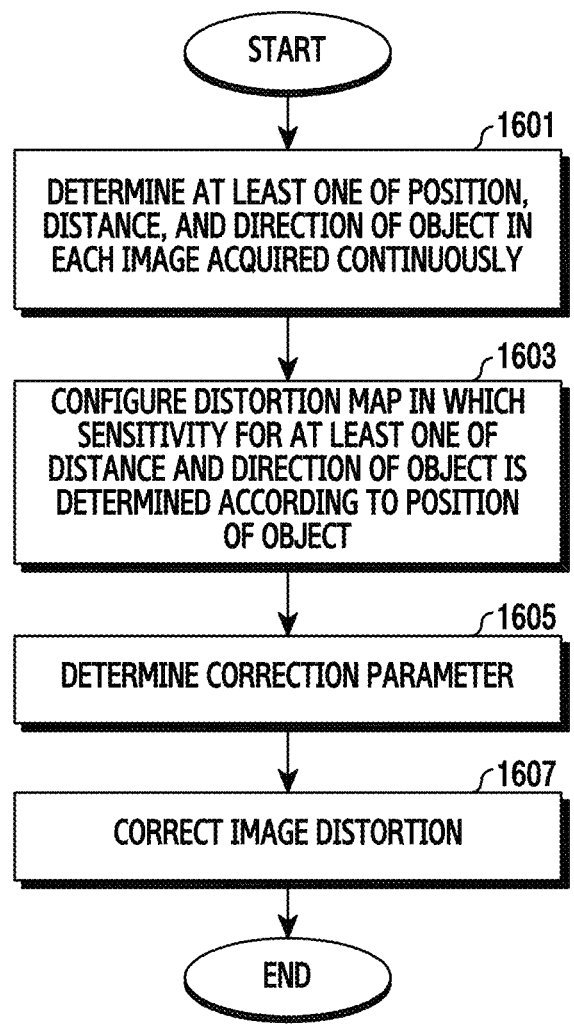
FIG. 16 is a flowchart illustrating a method of correcting a distorted image at least based on a position of an object according to another exemplary embodiment of the present disclosure.

FIG. 16 is a flowchart illustrating a method of correcting a distorted image at least based on a position of an object according to another exemplary embodiment of the present disclosure.

FIG. 17 illustrates an example of a method of correcting a distorted image at least based on a position of an object according to another exemplary embodiment of the present disclosure.

In FIG. 16 and FIG. 17A to FIG. 17D, it is assumed that at least one of a distance and direction of an object image is changed while the position of the object image is fixed in images acquired continuously by using the camera module 291.

In one exemplary embodiment, the processor 120 may determine that the greater the sensitivity for detecting distance and/or direction, the greater the attribute change of an image region corresponding to the object.

Referring to FIG. 16 and FIG. 17A to FIG. 17D, in operation 1601, the processor 120 may determine at least one of the position, distance, and direction of the object in the image acquired continuously by using the camera module 291. For example, the processor 120 may determine at least one of the position, distance, and direction of the object for each of first and second image frames acquired continuously by using the camera module 291. In operation 1603, the processor 120 may configure a distortion map in which a sensitivity for at least one of the distance and direction of the object is differently determined according to the position of the object image. In one exemplary embodiment, the sensitivity for at least one of the distance and direction of the object may be defined as a level of changing the distortion map according to a change amount (or a change level) of at least one of the distance and direction of the object. For example, the greater the sensitivity for at least one of the distance and direction of the object, the greater the level of changing the distortion map may be, even if the change amount of at least one of the distance and direction of the object is identical.

In one exemplary embodiment, the processor 120 may configure a distortion map such that the farther the distance of the object image from the center of the entire image without a change of a position of the object image at the first time and the second time after the first time, the greater the sensitivity for at least one of a distance and direction of an object.

Figure 17A:
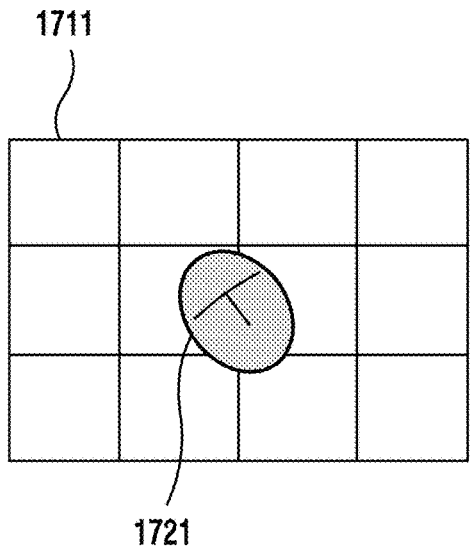
FIG. 17A, FIG. 17B, FIG. 17C and FIG. 17D illustrate an example of a method of correcting a distorted image at least based on a position of an object according to another exemplary embodiment of the present disclosure.
Figure 17B:
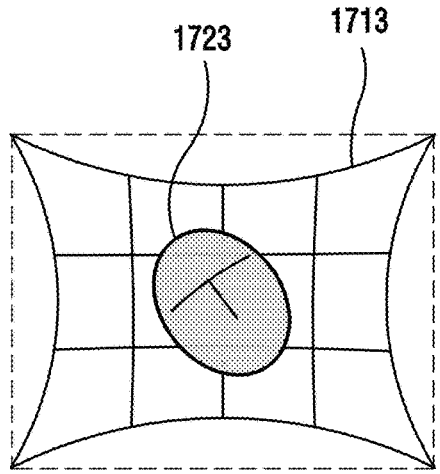
Figure 17C:
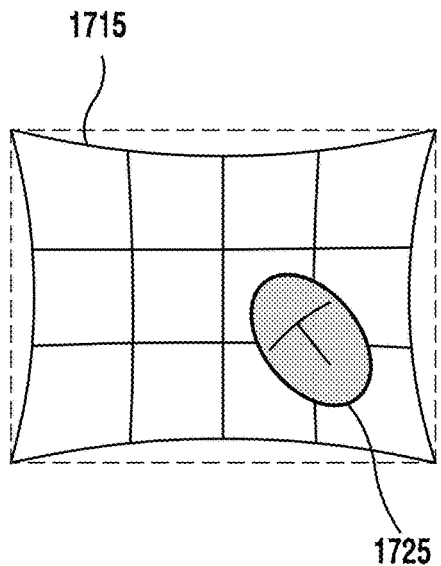
Figure 17D:
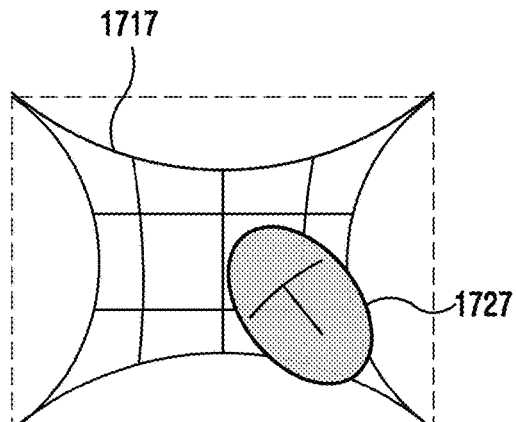

For example, FIG. 17A and FIG. 17B illustrate a change of a distortion map when a distance of an object image is increased without a change in a position at the center of the image acquired by using the camera module 291. FIG. 17C and FIG. 17D illustrate a change of a distortion map when a distance of an object image is increased without a position change at a location some distance from the center of the image acquired by using the camera module 291.

In one exemplary embodiment, it may be assumed that a distance away from the camera 291 of an object image 1721 of FIG. 17A is the same as a distance of an object image 1725 of FIG. 17C, and a distance of an object image 1723 of FIG. 17B is the same as a distance of an object image 1727 of FIG. 17D. In one exemplary embodiment, if the distance of the image object located at the center of the entire image is changed from FIG. 17A to FIG. 17B, the distortion map may be changed from a distortion map 1711 to a distortion map 1713. In another exemplary embodiment, if the distance of the image object some distance from the center is changed from FIG. 17C to FIG. 17D, the distortion map may be changed from a distortion map 1715 to a distortion map 1717.

In one exemplary embodiment, comparing FIG. 17A and FIG. 17B and comparing FIG. 17C and FIG. 17D, the processor 120 may configure the distortion map such that a change level of the distortion map for a case where the image is changed from FIG. 17C to FIG. 17D is greater than a case where the image is changed from FIG. 17A to FIG. 17B.

In operation 1605, the processor 120 may determine a correction parameter for the distortion map.

In operation 1607, the processor 120 may correct a distortion of the image acquired by using the camera module 291 at least based on the determined correction parameter.

Figure 18:
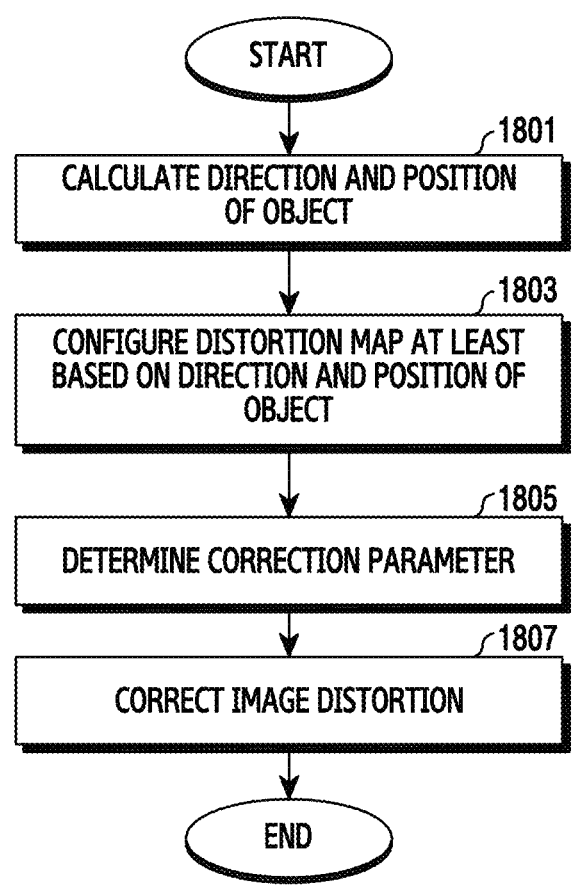
FIG. 18 is a flowchart illustrating a method of correcting a distorted image at least based on a direction of an object according to another exemplary embodiment of the present disclosure.

FIG. 18 is a flowchart illustrating a method of correcting a distorted image at least based on a direction of an object according to another exemplary embodiment of the present disclosure.

FIG. 19A, FIG. 19B, FIG. 20A, and FIG. 20B illustrate an example of a method of correcting a distorted image at least based on a direction of an object according to another exemplary embodiment of the present disclosure.

In one exemplary embodiment, the processor 120 may determine a direction of an object at a first time and a second time after the first time to determine an attribute change of an image region corresponding to the object, for example, a direction change of the object. In one exemplary embodiment, the processor 120 may configure a distortion map at each time when the direction of the object is determined at the first time and the second time after the first time. Hereinafter, the determining of the object direction and the configuring of the distortion map at the first time and the second time after the first time will be described.

Referring to FIG. 18 to FIG. 20, in operation 1801, the processor 120 may determine a direction and position of an object.

In one exemplary embodiment, the processor 120 may determine a relative direction of an object with respect to the camera module 291. In another exemplary embodiment, the processor 120 may determine a relative angle of an acquired object image corresponding to the determined direction.

In operation 1803, the processor 120 may configure a distortion map at least based on the direction and position of the object.

Figure 19A:
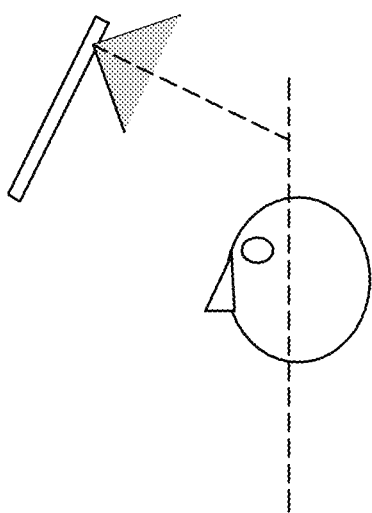

In one exemplary embodiment, if the object is a human face, in a state where an electronic device captures the human face from the front of the electronic device, if the electronic device is moved to a position above the human face as shown in FIG. 19A, a forehead image portion may be enlarged and a chin image portion may be shrunk in a human face image acquired by using the camera module 291. In another exemplary embodiment, if the object is the human face, in the state where the electronic device captures the human face from the front, if the electronic device is moved to a position below the human face as shown in FIG. 19B, the chin image portion may be enlarged and the forehead image portion may be shrunk in the human face image acquired by using the camera module 291.

In one exemplary embodiment, as shown in FIG. 19A, if the electronic device (or the camera module 291) is moved in an upward direction of the object when the direction of an object (or an object image 2019) is fixed, the processor 120 may configure an object distortion map 2011 in an entire image 2000 as shown in the left picture of FIG. 20A. For example, the processor 120 may configure the distortion map in such a manner that an upper portion of a distortion map 2021 is widened, and a lower portion of the distortion map 2021 is narrowed. Although the distortion map is illustrated as a straight line in the left picture of FIG. 20A, the present disclosure is not limited thereto. For example, the distortion map may be illustrated as a curved line.

Figure 19B:
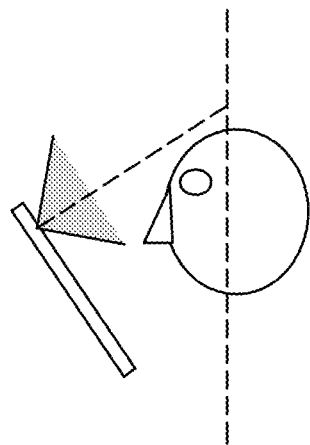

In another exemplary embodiment, as shown in FIG. 19B, if the electronic device (or the camera module 291) is moved in a downward direction of the object when the direction of an object (or an object image 2025) is fixed, an object distortion map 2015 in an entire image 2003 as shown in the left picture of FIG. 20B may be configured. For example, the processor 120 may configure the distortion map in such a manner that an upper portion of the distortion map 2015 is narrowed, and a lower portion of the distortion map 2015 is widened.

Although the distortion map is illustrated as a straight line in the left picture of FIG. 20B, the present disclosure is not limited thereto. For example, the distortion map may be illustrated as a curved line.

In operation 1805, the processor 120 may determine a correction parameter.

For example, the processor 120 may determine a correction parameter for the distortion map. For example, in case of FIG. 20A, the processor 120 may determine a correction parameter 2031 for compensating for a shape of the distortion map illustrated in the left picture of FIG. 20A. In another example, in case of FIG. 20B, the processor 120 may determine a correction parameter 2033 for compensating for a shape of the distortion map illustrated in the left picture of FIG. 20B.

In operation 1807, the processor 120 may correct a distortion of the acquired image at least based on the determined correction parameter.

In one exemplary embodiment, in order to correct the distortion of the acquired image, the processor 120 may crop at least one part of the corrected image. For example, if the correction parameter is applied to the entire image acquired by using the camera module 291, the processor 120 may crop an image portion (e.g., a region between an image 2001 and a corrected image 2013 or a region between an image 2005 and a correct image 2017) to be located outside a screen to which the image is output. In another example, the processor 120 may crop an image portion except for an image portion corresponding to the distortion map (or an image portion including the object image) in the entire image acquired by using the camera module 291.

Figure 21:
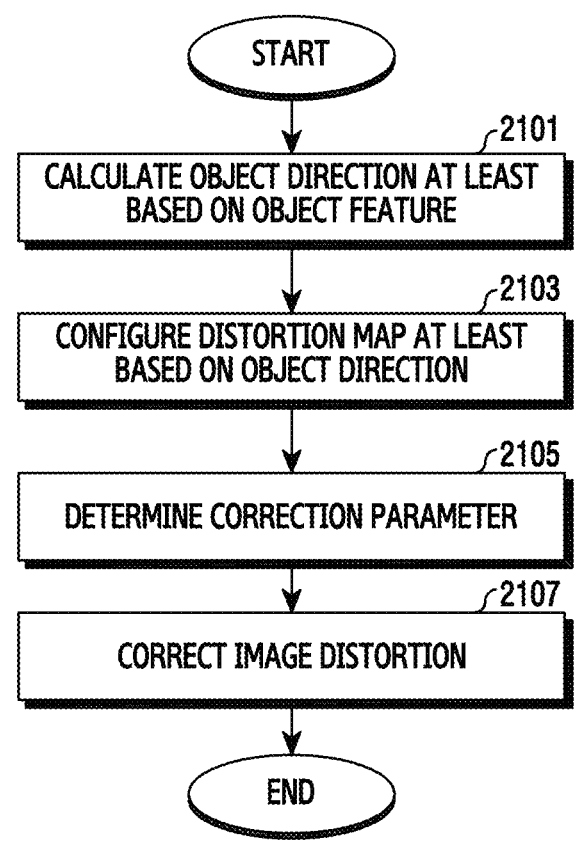
FIG. 21 is a flowchart illustrating a method of correcting a distorted image at least based on a direction of an object according to another exemplary embodiment of the present disclosure.

FIG. 21 is a flowchart illustrating a method of correcting a distorted image at least based on a direction of an object according to another exemplary embodiment of the present disclosure.

FIG. 22A to FIG. 22C and FIG. 23 illustrate an example of a method of correcting a distorted image at least based on a direction of an object according to another exemplary embodiment of the present disclosure.

In one exemplary embodiment, the processor 120 may determine a direction of an object at a first time and a second time after the first time to determine an attribute change of an image region corresponding to the object, for example, a direction change of the object. In one exemplary embodiment, the processor 120 may configure a distortion map at each time when the direction of the object is determined, such as at the first time and the second time after the first time. Hereinafter, the determining of the object direction and the configuring of the distortion map at the first time and the second time after the first time will be described.

Referring to FIG. 21 to FIG. 23, in operation 2101, the processor 120 may determine a direction and position of an object at least based on a feature of the object.

Figure 22A:
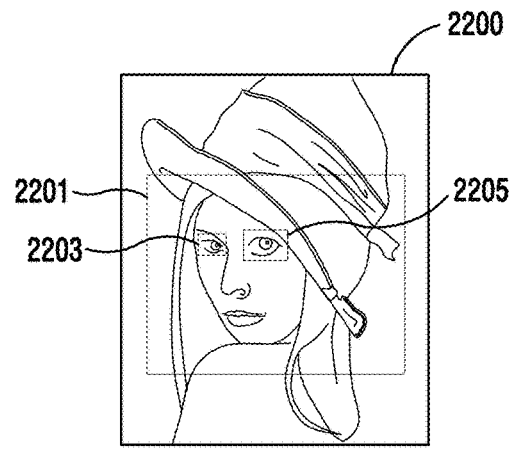
FIG. 22A, FIG. 22B, FIG. 22C, FIG. 23A, and FIG. 23B illustrate an example of a method of correcting a distorted image at least based on a direction of an object according to another exemplary embodiment of the present disclosure.

For example, if an object 2201 is a human face in FIG. 22A, an image 2200 including an image of a human face forming a specific angle about (or with respect to) the camera module 291 may be acquired. In one exemplary embodiment, the processor 120 may extract two eyes (or a distance of the eyes) 2203 and 2205 as a feature of the human face. In another exemplary embodiment, the processor 120 may extract two irises (or a distance between the irises) as the feature of the human face. In one exemplary embodiment, the processor 120 may determine a direction (or an angle) of an object for the camera module 291 at least based on the extracted eyes (or irises). For example, if the object is a human face, the processor 120 may determine an angle by which the human face is tilted with respect to the camera module 291 according to a distance ratio of both eyes of the human. For example, if a ratio of a distance of one eye 2203 to a distance of the other eye 2205 is ½, the processor 120 may determine that the human face is tilted by 60° with respect to the camera module 291 (or the front of the electronic device). In another example, if a ratio of a distance of one eye 2203 to a distance of the other eye 2205 is 0.707, the processor 120 may determine that the human face is tilted by 45° with respect to the camera module 291 (or the front of the electronic device).

Figure 22B:
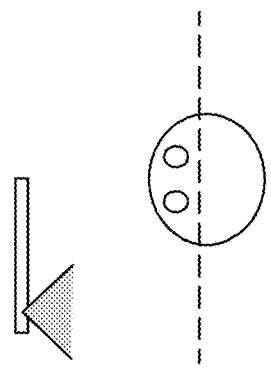
Figure 22C:
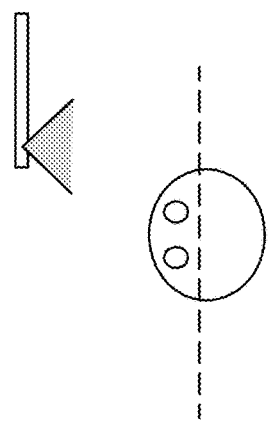

FIG. 22B illustrates the camera module 291 for capturing an object in a left direction of the object, and FIG. 22C illustrates the camera module 291 for capturing an object in a right direction of the object.

In one exemplary embodiment, in case of capturing in the left direction of the object as shown in FIG. 22B, if the object is a human face, the processor 120 may acquire a right eye image which is larger than a left eye image. In one exemplary embodiment, in case of acquiring the right eye image larger than the left eye image, the processor 120 may determine that this is a state where the object may rotate in a right direction from a front view.

In one exemplary embodiment, in case of capturing in the right direction of the object as shown in FIG. 22C, if the object is a human face, the processor 120 may acquire a right eye image which is larger than a left eye image. In one exemplary embodiment, in case of acquiring the right eye image larger than the left eye image, the processor 120 may determine that this is a state where the object may rotate in a left direction from a front view.

In operation 2103, the processor 120 may configure a distortion map at least based on a direction of the object.

Figure 23B:
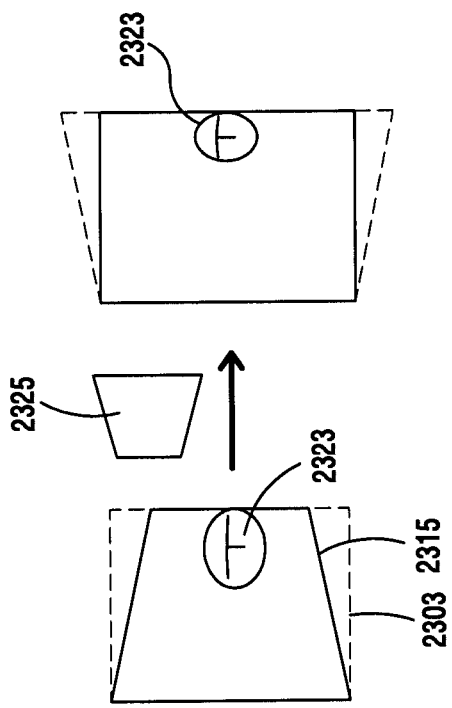
Figure 23A:
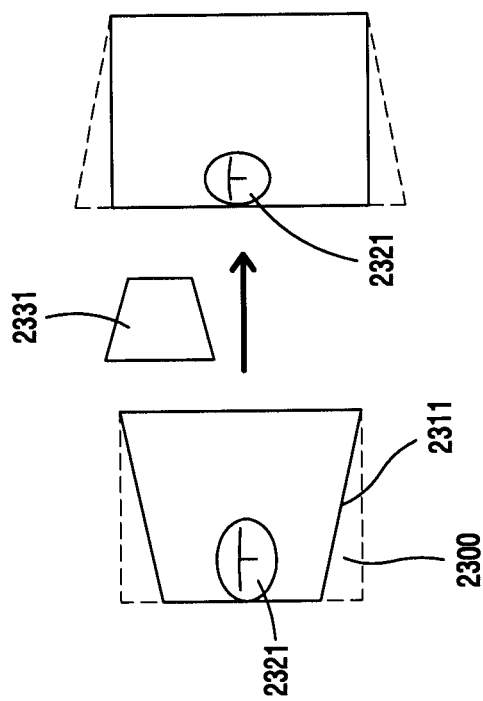

In one exemplary embodiment, the left picture of FIG. 23A illustrates an image 2300 acquired by using the camera module 291 in a left direction of an object 2321. In one exemplary embodiment, the processor 120 may configure a distortion map 2311 which is narrowed towards a left portion and is widened towards a right portion.

In another exemplary embodiment, the left picture of FIG. 23B illustrates an image 2303 acquired by using the camera module 291 in a right direction of an object 2323. In one exemplary embodiment, the processor 120 may configure a distortion map 2315 which is narrowed towards a right portion and is widened towards a left portion.

In operation 2105, the processor 120 may determine a correction parameter.

For example, the processor 120 may determine a correction parameter for the distortion map. For example, in case of FIG. 23A, the processor 120 may determine a correction parameter 2331 for compensating for a shape of the distortion map 2311 illustrated in the left picture of FIG. 23A. In another example, in case of FIG. 23B, the processor 120 may determine the correction parameter 2325 for compensating for a shape of the distortion map 2315 illustrated in the left picture of FIG. 23B.

In operation 2107, the processor 120 may correct a distortion of the acquired image at least based on the determined correction parameter.

Figure 24:
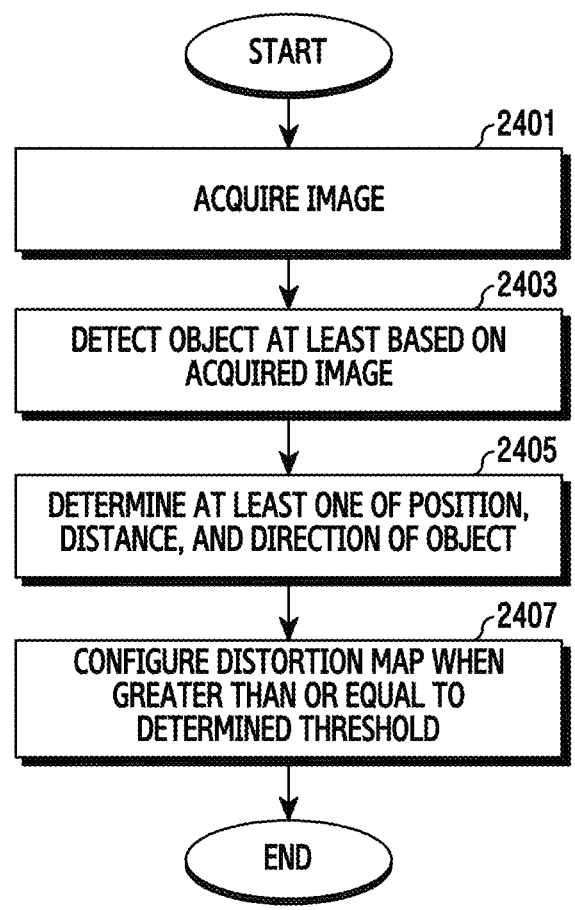
FIG. 24 is a flowchart illustrating an image processing method according to another exemplary embodiment of the present disclosure.

FIG. 24 is a flowchart illustrating an image processing method according to another exemplary embodiment of the present disclosure.

In one exemplary embodiment, the processor 120 may determine an attribute of an object at a first time and a second time after the first time to determine an attribute change of an image region corresponding to the object. Hereinafter, one exemplary embodiment of a method of determining an attribute value of the object at the first time and the second time after the first time will be described.

In one exemplary embodiment, in operation 2401, the processor 120 may acquire an image by using the camera module 291.

In operation 2403, in one exemplary embodiment, the processor 120 may detect the object at least based on the acquired image.

In operation 2407, if at least one of a position, distance, and/or direction of the object determined in operation 2405 is greater than or equal to a determined threshold, the processor 120 may configure a distortion map at each of the first time and the second time after the first time.

For example, the processor 120 may determine whether the position of the object is located at a distance greater than or equal to a threshold from a center of an original image.

In another example, the processor 120 may determine whether the distance of the object is greater than or equal to a determined threshold distance.

In another example, the processor 120 may determine whether a direction of the object is greater than or equal to a threshold direction with respect to a front direction of the object for the camera module 291.

In one exemplary embodiment, if at least one of a position, distance, and direction of the object (or a combination of the position, distance, and direction of the object) is greater than or equal to a determined threshold value, the processor 120 may determine that an image of the object is distorted.

In one exemplary embodiment, the processor 120 may determine a threshold value at least based on a user input (or a user selection).

In one exemplary embodiment, if at least one of the determined position, distance, and direction of the object is greater than or equal to the determined threshold value, the processor 120 may configure the distortion map at least based on the position, distance, and direction of the object.

In another exemplary embodiment, if at least one of the determined position, distance, and direction of the object is less than the determined threshold value, the processor 120 may determine that the original image is not distorted.

Figure 25:
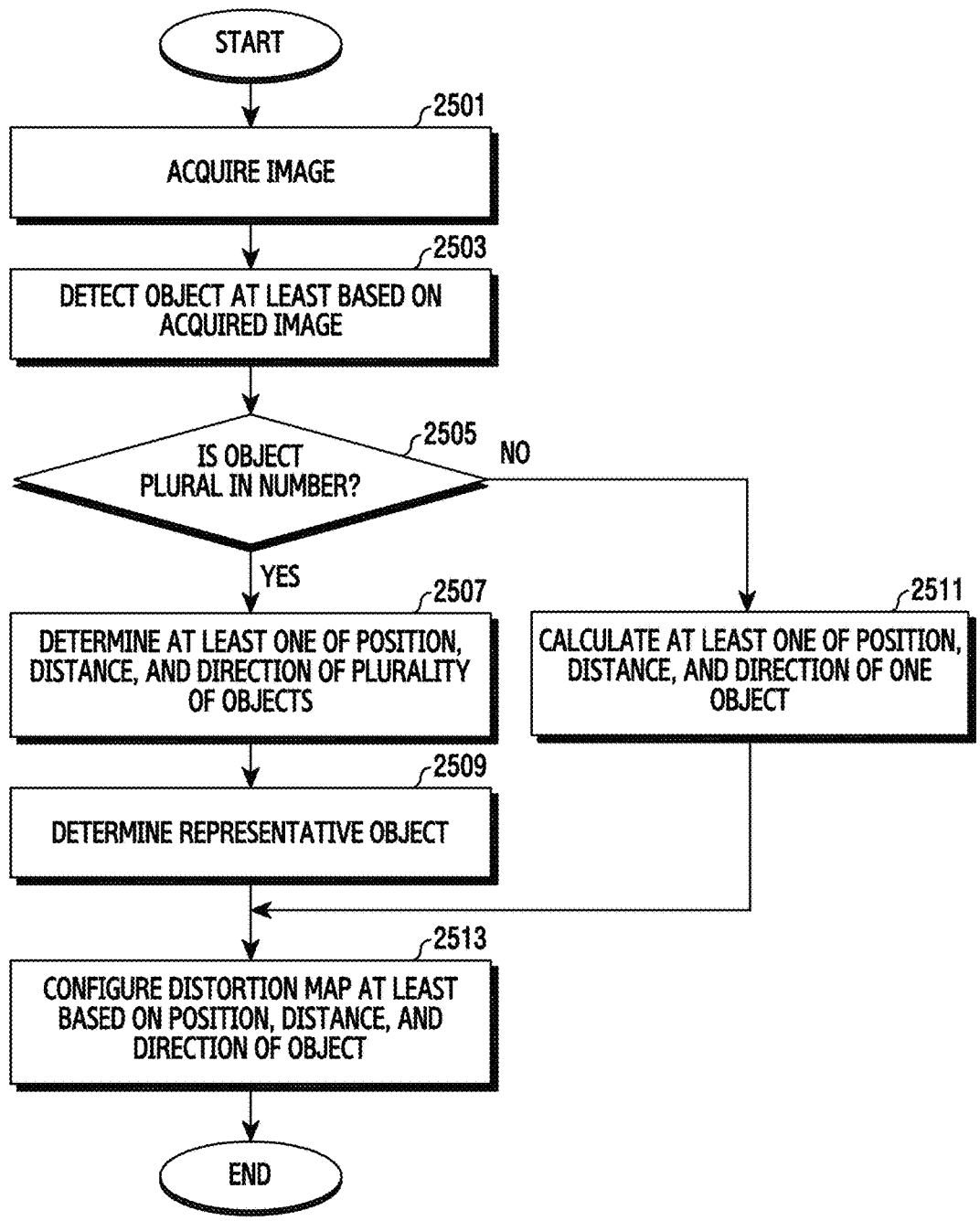
FIG. 25 is a flowchart illustrating an image processing method according to another exemplary embodiment of the present disclosure.

FIG. 25 is a flowchart illustrating an image processing method according to another exemplary embodiment of the present disclosure.

In one exemplary embodiment, the processor 120 may determine an attribute of an object at a first time and a second time after the first time to determine an attribute change of an image region corresponding to the object, for example, an attribute change of the object. Hereinafter, one exemplary embodiment of a method of determining an attribute value of the object at the first time and the second time after the first time and for configuring a distortion map at the first time and the second time will be described.

In one exemplary embodiment, in operation 2501, the processor 120 may acquire an image by using the camera module 291.

In operation 2503, in one exemplary embodiment, the processor 120 may detect the object at least based on the acquired image.

In operation 2505, the processor 120 may determine whether a plurality of objects are detected. For example, if the object is a human face, the processor 120 may determine whether a plurality of human faces are detected.

In operation 2507, the processor 120 may determine at least one of a position, distance, and direction of each of the plurality of objects. The operation of determining at least one of the position, distance, and direction of each of the plurality of objects in operation 2507 is at least partially identical or similar to the operation 701 of FIG. 7 for determining at least one of the position, distance, and direction of the object, and thus detailed descriptions thereof will be omitted.

In operation 2509, the processor 120 may determine a representative object among the plurality of objects.

For example, the processor 120 may determine an object located at a farthest distance from a center of an image acquired by using the camera module 291 among the plurality of objects as the representative object.

In another example, the processor 120 may determine an object having a greatest distance among the plurality of objects as the representative object.

In another example, the processor 120 may determine an object having the greatest relative angle (or direction) against the camera module 291 among the plurality of objects as the representative object.

In one exemplary embodiment, the processor 120 may determine the representative object according to a combination of the position, distance, and direction of the object. For example, in case of a plurality of objects located at the same distance from the center of the image acquired by using the camera module 291, an object having the greatest distance of the object may be determined as the representative object. In another example, the processor 120 may determine the representative object by assigning a priority to the position among the position, distance, and direction of the object. For example, if a first object is located at a farthest distance from the center of the image acquired by using the camera module 291 in comparison with a second object and if a distance of the image is small, the processor 120 may determine the first object as the representative object by assigning the priority to the position of the object. However, the present disclosure is not limited thereto.

In operation 2511, if it is determined in operation 2505 that there is a single object, the processor 120 may determine at least one of a position, distance, and direction of the single object.

In operation 2513, the processor 120 may configure a distortion map based on at least one of a position, distance, and direction of the representative object.

Although not shown in FIG. 25, if the distortion map is configured in operation 2513, a correction parameter corresponding to the configured distortion map may also be determined.

FIG. 26A, FIG. 26B, FIG. 27A, and FIG. 27B illustrate an example of a method of applying an algorithm depending on a specific angle of an object according to an exemplary embodiment of the present disclosure.

Figure 26A:
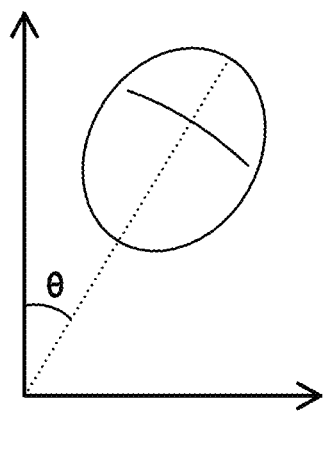
FIG. 26A, FIG. 26B, FIG. 27A, and FIG. 27B illustrate an example of a method of applying an algorithm depending on a specific angle of an object according to an exemplary embodiment of the present disclosure.
Figure 26B:
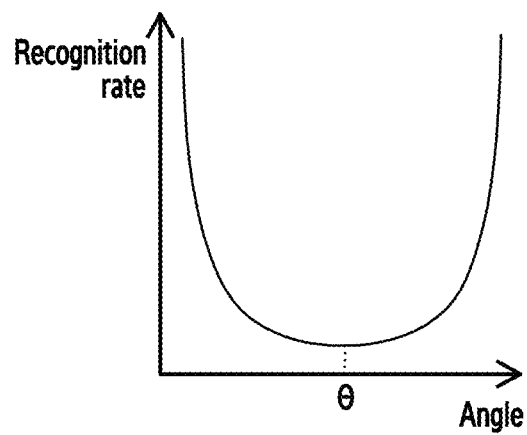

In one exemplary embodiment, in case of tilting about the camera module 261 of the object, a recognition rate of the object may vary depending on a tilt angle. For example, if the object is tilted by a specific angle θ against the camera module 261 as shown in FIG. 26A, a recognition rate of the object may vary as shown in FIG. 26B. For example, if the object is tilted by 45° against the camera module 261, the recognition rate of the object may be the smallest.

In one exemplary embodiment, if an angle of the object against the camera module 261 is within a predetermined range, the processor 120 may differently apply an algorithm for detecting the object.

Figure 27A:
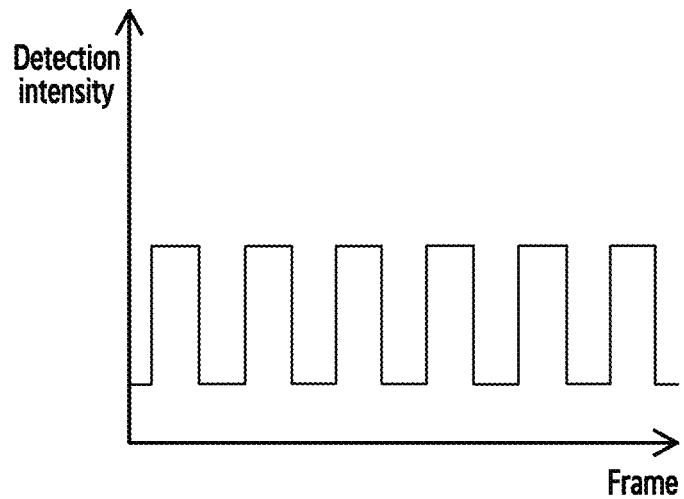

For example, if the object recognition rate depending on the angle of the object is great than or equal to a threshold, the processor 120 may apply an algorithm for detecting objects having the same detention intensity as shown in FIG. 27A.

Figure 27B:
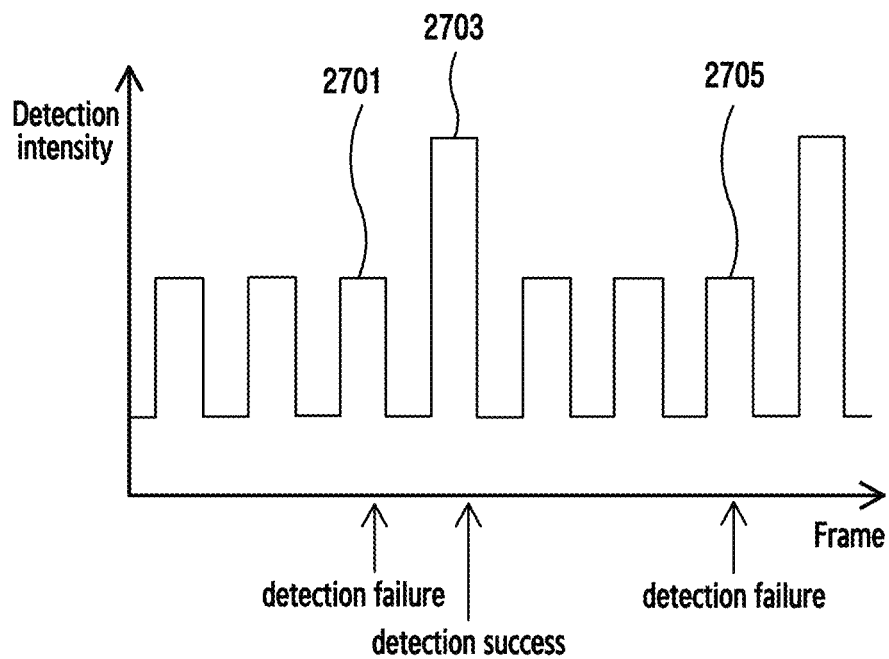

In another example, in FIG. 27B, if it fails to detect an object in a first frame (or at times 2701 and 2705 at which the object detection fails) in a state where an object is detected by applying a first object detection algorithm, the processor 120 may detect the object by applying a second object detection algorithm having higher detection intensity than the first object detection algorithm at a time 2703 of a second frame. In one exemplary embodiment, the second object detection algorithm may be an algorithm which has a great computation amount and a great power consumption amount and has a high object detection success rate in comparison with the first object detection algorithm. In one exemplary embodiment, if the object is successfully detected by applying the second object detection algorithm, the processor 120 may detect the object by using the first object detection algorithm.

In one exemplary embodiment, the processor 120 may adaptively detect the object by applying an algorithm having high detection intensity when the object detection fails as to an angle of an object having a low object recognition rate.

According to various exemplary embodiments of the present disclosure, a method may include acquiring at least one image of at least one object in an electronic device, determining a change of an attribute corresponding to the at least one object, selecting at least one correction method based on the attribute change, correcting the at least one image using the at least one correction method, and displaying the at least one image corrected by the at least one correction method.

In one exemplary embodiment, the electronic device may further include at least one camera module for acquiring the at least one image.

In one exemplary embodiment, the attribute may include a position, a distance, and/or a direction of the at least one image of the object or a combination thereof.

In one exemplary embodiment, the method may further include acquiring a first image of the object and a second image of the object, comparing the first image and the second image, and determining the attribute change at least based in part on the comparison result.

In one exemplary embodiment, the when the at least one image includes a plurality of objects, the method may further include determining a representative object among the plurality of objects, and determining the attribute change corresponding to the representative object.

In one exemplary embodiment, the correcting the at least one image using the at least one correction may further include configuring a distortion map, and determining a correction parameter corresponding to the distortion map.

In one exemplary embodiment, the method may further include acquiring a first image of the object and a second image of the object, determining a first attribute value corresponding to the object from the first image, correcting the first image using a first correction method corresponding to the first attribute value, determining a second attribute value corresponding to the object from the second image, determining a speed at which the first attribute value changed to the second attribute value as the attribute change corresponding to the object, select a second correction method for the second image when the speed is within a predetermined range; and select a third correction method for the second image when the speed is not within the predetermined range.

In one exemplary embodiment, the third correction method may include correcting the first image using the first correction method and correcting the second image using the second correction method.

In one exemplary embodiment, the method may further include cropping at least one part of the at least one image.

In one exemplary embodiment, a computer readable medium storing a program for executing operations of a method may include acquiring at least one image corresponding to an object in an electronic device, determining a change of an attribute of an image region corresponding to the object at least based on the at least one image, selecting at least one correction method among the one or more correction methods at least based on the change of the attribute, and providing the at least one image through a display operatively coupled to the processor in a state of being corrected by the at least one correction method.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

Although the present disclosure has been described with an exemplary embodiment, various changes and modifications may be suggested to one skilled in the art. It is intended that the present disclosure encompass such changes and modifications as fall within the scope of the appended claims.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, or a combination hardware configured with machine executable code and may be performed in whole or in part within the programmed instructions of a computer. No claim element herein is to be construed under the provisions of 35 U.S.C. 112, sixth paragraph, unless the element is expressly recited using the phrase "means for."

What is claimed is:

1. An electronic device comprising:
a memory for storing one or more instructions;
a display; and
a processor, wherein the processor executing the one or more instructions stored in the memory is configured to:
acquire a plurality of images of at least one object, wherein the plurality of images includes a first image and a second image which are continuously acquired;
determine a first attribute value corresponding to the at least one object from the first image;
correct the first image by applying a first correction parameter to the first image, the first correction parameter corresponding to the first attribute value;
determine a second attribute value corresponding to the at least one object from the second image;
determine an amount at which the first attribute value is changed to the second attribute value;
in response to a determination that the amount is within a predetermined range, correct the second image by applying a second correction parameter to the second image, the second correction parameter corresponding to the second attribute value;
in response to a determination that the amount is not within the predetermined range, correct the second image by applying a third correction parameter to the second image, the third correction parameter being between the first correction parameter and the second correction parameter, such that the at least one object in the first image is not substantially changed into the at least one object in the second image when the corrected first image and the corrected second image are continuously displayed;
control the display to display at least one of the corrected first image or the corrected second image,
wherein the first attribute value and the second attribute value include at least one of values of positions, distances, or directions of the plurality of images of the at least one object, and
wherein, to correct the first image and the second image, the processor is further configured to:
configure, based on the first attribute value and the second attribute value, a distortion maps; and
determine correction parameters corresponding to the distortion maps.

2. The electronic device of claim 1, further comprising at least one camera for acquiring the plurality of images.

3. The electronic device of claim 1, wherein the processor is further configured to:
compare the first image and the second image; and
determine the amount, based at least in part on the comparison.

4. The electronic device of claim 1, wherein when the plurality of images respectively includes a plurality of objects, the processor is further configured to determine a representative object among the plurality of objects, and determine, based on a change of an attribute value of the representative object, the amount.

5. The electronic device of claim 1, wherein the processor is further configured to crop at least one part of each of the plurality of images.

6. The electronic device of claim 1, wherein the processor is further configured to control the display to display a preview of the at least one of the corrected first image or the corrected second image.

7. A method comprising:
acquiring, by a processor of an electronic device, a plurality of images of at least one object, wherein the plurality of images includes a first image and a second image which are continuously acquired;

determining, by the processor, a first attribute value corresponding to the at least one object from the first image;

correcting, by the processor, the first image by applying a first correction parameter to the first image, the first correction parameter corresponding to the first attribute value;

determining, by the processor, a second attribute value corresponding to the at least one object from the second image;

determining, by the processor, an amount at which the first attribute value is changed to the second attribute value;

in response to a determination that the amount is within a predetermined range, correcting, by the processor, the second image by applying a second correction parameter to the second image, the second correction parameter corresponding to the second attribute value;

in response to a determination that the amount is not within the predetermined range, correcting, by the processor, the second image by applying a third correction parameter to the second image, the third correction parameter being between the first correction parameter and the second correction parameter, such that the at least one object in the first image is not changed into the at least one object in the second image when the corrected first image and the corrected second image are continuously displayed;

displaying, by a display of the electronic device, at least one of the corrected first image or the corrected second image, wherein the first attribute value and the second attribute value include at least one of values of positions, distances, or directions of the plurality of images of the at least one object, and wherein correcting the first image and the second image further comprises: configuring, based on the first attribute value and the second attribute value, distortion maps; and determining correction parameters corresponding to the distortion maps.

8. The method of claim 7, wherein the electronic device further comprises at least one camera for acquiring the plurality of images.

9. The method of claim 7, further comprising:
comparing the first image and the second image; and
determining the amount, based at least in part on the comparison.

10. The method of claim 7, wherein when the plurality of images respectively include a plurality of objects, the method further comprises:

determining a representative object among the plurality of objects; and determining, based on a change of an attribute value of the representative object, the amount.

11. The method of claim 7, further comprises cropping at least one part of each of the plurality of images.

12. A non-transitory computer readable medium storing a program for executing operations comprising:

acquiring, by a processor of an electronic device, a plurality of images of at least one object, wherein the plurality of images includes a first image and a second image which are continuously acquired;

determining, by the processor, a first attribute value corresponding to the at least one object from the first image;

correcting, by the processor, the first image by applying a first correction parameter to the first image, the first correction parameter corresponding to the first attribute value;

determining, by the processor, a second attribute value corresponding to the at least one object from the second image;

determining, by the processor, an amount at which the first attribute value is changed to the second attribute value;

in response to a determination that the amount is within a predetermined range, correcting, by the processor, the second image by applying a second correction parameter to the second image, the second correction parameter corresponding to the second attribute value;

in response to a determination that the amount is not within the predetermined range, correcting, by the processor, the second image by applying a third correction parameter to the second image, the third correction parameter being between the first correction parameter and the second correction parameter, such that the at least one object in the first image is not changed into the at least one object in the second image when the corrected first image and the corrected second image are continuously displayed; and displaying, by a display of the electronic device, at least one of the corrected first image or the corrected second image, wherein the first attribute value and the second attribute value include at least one of values of positions, distances, or directions of the plurality of images of the at least one object, and wherein correcting the first image and the second image further comprises:

configuring, based on the first attribute value and the second attribute value, distortion maps; and determining correction parameters corresponding to the distortion maps.

* * * * *